US012128301B2

United States Patent
Taka et al.

(10) Patent No.: US 12,128,301 B2
(45) Date of Patent: *Oct. 29, 2024

(54) PROGRAM, GAME CONTROL METHOD, AND INFORMATION PROCESSING APPARATUS

(71) Applicant: GREE, Inc., Tokyo (JP)

(72) Inventors: Daisuke Taka, Tokyo (JP); Motoshi Abe, Tokyo (JP); Masaru Ida, Tokyo (JP); Kiyoto Suzuki, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,304

(22) Filed: Oct. 31, 2023

(65) Prior Publication Data

US 2024/0058696 A1    Feb. 22, 2024

Related U.S. Application Data

(63) Continuation of application No. 17/690,571, filed on Mar. 9, 2022, now Pat. No. 11,833,421, which is a continuation of application No. 17/014,226, filed on Sep. 8, 2020, now Pat. No. 11,305,189, which is a
(Continued)

(30) Foreign Application Priority Data

| Nov. 27, 2015 | (JP) | 2015-231214 |
| May 23, 2016 | (JP) | 2016-102784 |

(51) Int. Cl.
| A63F 13/42 | (2014.01) |
| A63F 13/2145 | (2014.01) |
| A63F 13/56 | (2014.01) |
| G06F 3/04815 | (2022.01) |
(Continued)

(52) U.S. Cl.
CPC .......... *A63F 13/42* (2014.09); *A63F 13/2145* (2014.09); *A63F 13/56* (2014.09);
(Continued)

(58) Field of Classification Search
CPC ...... A63F 13/42; A63F 13/2145; A63F 13/56; G06F 2/04815; G06F 3/04845; G06F 3/04883
(Continued)

(56) References Cited

U.S. PATENT DOCUMENTS 6,697,048 B2 * 2/2004 Rosenberg ............ G06F 3/0383
345/161
8,033,914 B2   10/2011 Yoshikawa
(Continued)

FOREIGN PATENT DOCUMENTS

| JP | 11179048 A | 7/1999 |
| JP | 200573903 A | 3/2005 |
(Continued)

OTHER PUBLICATIONS

Office Action issued on Oct. 17, 2023 in corresponding Japanese application No. 2022-054932; 7 pages.
(Continued)

*Primary Examiner* — Pierre E Elisca
(74) *Attorney, Agent, or Firm* — Maier & Maier, PLLC

(57) ABSTRACT

A program, a game control method, and an information processing apparatus, which are capable of improving operability of a game. A program causing an information processing apparatus to execute a step of causing an object arranged on a field object in a virtual space in which a coordinate system having a first axis and a second axis is set to be displayed on a screen in which a coordinate system having a third axis and a fourth axis is set, a step of detecting first and second positions on the screen while the first user operation is being detected, and a moving step of moving the object according to a first user operation.

20 Claims, 11 Drawing Sheets

Related U.S. Application Data continuation of application No. 16/371,352, filed on Apr. 1, 2019, now Pat. No. 10,799,794, which is a continuation of application No. 15/279,904, filed on Sep. 29, 2016, now Pat. No. 10,293,253.

(51) Int. Cl.
*G06F 3/04845* (2022.01)
*G06F 3/04883* (2022.01)

(52) U.S. Cl.
CPC ...... *G06F 3/04815* (2013.01); *G06F 3/04845* (2013.01); *G06F 3/04883* (2013.01)

(58) Field of Classification Search
USPC .......................................................... 463/31
See application file for complete search history.

(56) References Cited

U.S. PATENT DOCUMENTS

| | | | |
|---|---|---|---|
| 9,875,020 | B2 | 1/2018 | Claros De Luna |
| 10,589,174 | B2 * | 3/2020 | Fukuda .................. A63F 13/30 |
| 2005/0221893 | A1 | 10/2005 | Ohta |
| 2006/0089198 | A1 | 4/2006 | Sawatani |
| 2006/0111182 | A1 | 5/2006 | Nakanishi et al. |
| 2006/0217196 | A1 | 9/2006 | Kikkawa |
| 2007/0018968 | A1 | 1/2007 | Iwamoto |
| 2007/0111803 | A1 | 5/2007 | Moro |
| 2008/0291173 | A1 | 11/2008 | Suzuki |
| 2008/0300055 | A1 * | 12/2008 | Lutnick .............. G07F 17/3209 463/39 |
| 2010/0188344 | A1 | 7/2010 | Shirakawa |
| 2011/0130201 | A1 * | 6/2011 | Nojiri ..................... A63F 13/42 463/31 |
| 2011/0157013 | A1 | 6/2011 | Shiraiwa |
| 2012/0007882 | A1 | 1/2012 | Samurai |
| 2012/0306775 | A1 | 12/2012 | Miyachi |
| 2013/0106744 | A1 | 5/2013 | Asakura |
| 2013/0316816 | A1 | 11/2013 | Okamura |
| 2014/0115532 | A1 | 4/2014 | Suzuki |
| 2014/0115533 | A1 | 4/2014 | Suzuki |
| 2014/0119580 | A1 | 5/2014 | Osada |
| 2014/0357366 | A1 * | 12/2014 | Koganezawa .......... A63F 13/34 463/31 |
| 2016/0357404 | A1 | 12/2016 | Alonso Ruiz |
| 2017/0072317 | A1 * | 3/2017 | Nishikawa .............. A63F 13/56 |
| 2017/0151497 | A1 | 6/2017 | Taka |
| 2018/0018014 | A1 * | 1/2018 | Lutnick ................... G07F 17/32 |
| 2018/0104591 | A1 * | 4/2018 | Fukuda ................. G06F 3/0488 |
| 2019/0030429 | A1 * | 1/2019 | Nishikawa ............. A63F 13/56 |
| 2020/0033938 | A1 * | 1/2020 | Lutnick ................... G07F 17/32 |

FOREIGN PATENT DOCUMENTS

| | | |
|---|---|---|
| JP | 200668387 A | 3/2006 |
| JP | 2006119774 A | 5/2006 |
| JP | 2006141723 A | 6/2006 |
| JP | 2008204191 A | 9/2008 |
| JP | 2008264276 A | 11/2008 |
| JP | 2011183025 A | 9/2011 |
| JP | 201233060 A | 2/2012 |
| JP | 2013039232 A | 2/2013 |
| JP | 2013-092942 A | 5/2013 |
| JP | 2013-235443 A | 11/2013 |
| JP | 201444455 A | 3/2014 |
| JP | 5701440 B1 | 4/2015 |
| JP | 2015173806 A | 10/2015 |

OTHER PUBLICATIONS

Kou3) Masami Takaoka, "New review One finger RPG that can be operated with one hand! The smartphone game will evolve in the "white cat project"!", Published: Sep. 9, 2014, Tapli, Printed: May 8, 2017, URL: http://web.archive.org/web/20140909061907/http://tappli.org/review-detail.php?id=21, 4 pgs.

Kou4) White Cat Project Strategy Manual, "What about the Punikon in white cat project?", Published: Nov. 9, 2014, Printed: May 8, 2017, URL: http://web.archive.org/web/20141109213411/http://www.riis.jp/category1/entry13.html, 9 pgs.

Kou5) Daichu, "White cat Strategy, Let's learn the basics of the battle first! I will explain how to move characters and how to avoid attacks", Published: Dec. 18, 2014, Printed: May 8, 2017, URL: http://web.archive.org/web/20141218154136/http://www.appps.jp/115523/, 7 pgs.

Kou6) Rayou, "White Cat Project strategy in depth Part 2: Let's get used to Punicon! Move and skill! [Beginners must-see]" Published: Mar. 22, 2015, Printed: May 8, 2017, URL: http://web.archive.org/web/20150322082056/http://octoba.net/archives/20140910-%E7%99%BD%E7%8C%AB%E3%83%97%E3%83%AD%E3%82%B8%E3%82%A7%E3%82%AF%E3%83%88%E5%BE%B9%E5%BA%95%E6%94%BB%E7%95%A5-2.html, 7 pgs.

Kou7) Coropla Co., Ltd., "White Cat Project Punicon Operation Movie", Published: Jul. 20, 2014, You Tube, Printed: May 8, 2017, URL: http://web.archive.org/web/20140720073919/http://www.youtube.com/watch?v=2rpM017TGAE, 3 pgs.

Kou8) Coropla Co., Ltd., "Number of application downloads and number of users for smartphones", Published: Nov. 28, 2015, You Tube, Printed: May 8, 2017, URL: https://web.archive.org/web/20151128182214/http://colopl.co.jp/ir/library/appdis.html, 3 pgs.

Kou12) Yukinori Yamazaki, "Book to become a game programmer" IBM PC/AT compatible machine version, CQ publishing corporation, Published: May 20, 1996, pp. 23-30, 11 pgs.

Kou13) Wikipedia, "Exed Exes", Published: Sep. 21, 2015, Wikipedia, Printed: May 19, 2017, URL:https://web.archive.org/web/20150921212308/http://ja.wikipedia.org/wiki/%E3%82%A8%E3%82%B0%E3%82%BC%E3%83%89%E3%82%A8%E3%82%B0%E3%82%BC%E3%82%B9, 5 pgs.

Kou14) Wikipedia, "RaiDen DX", Published: Oct. 27, 2011, Wikipedia, Printed: May 19, 2017, URL:https://web.archive.org/web/20111027210032/http://ja.wikipedia.org/wiki/ DX, 3 pgs.

Kou15) Name Over, Terra cresta, 16, Published: Nov. 12, 2002, retro games@2ch bulletin board, Printed: May 19, 2017, URL: https://web.archive.org/web/20021112170943/http://game.2ch.net/test/read.cgi/retro/1032372635/, 11 pgs.

Opposition Number Notice dated May 31, 2017 of corresponding registration No. JP6030258; 1 pg.

Opposition dated May 24, 2017 of corresponding registration No. JP6030258; 248 pgs.

Notice of reasons for revocation dated Dec. 7, 2017 of corresponding registration No. JP6030258; 6 pgs.

Sending notice of Reply copy and Hearing dated Dec. 7, 2017 of corresponding registration No. JP6030258; 6 pgs.

Written Opinion dated Jan. 31, 2018 of corresponding registration No. JP6030258; 6 pgs.

Correction Request dated Jan. 31, 2018 of corresponding registration No. JP6030258; 22 pgs.

Written Opinion dated Mar. 19, 2018 of corresponding registration No. JP6030258; 6 pgs.

Decision on opposition dated May 14, 2018 of corresponding registration No. JP6030258; 32 pgs.

Office Action corresponding application No. JP2016-102784 dated Jul. 19, 2016; 9 pgs.

Yamazaki, "Game Programming Guide Book", Published Feb. 1, 1998, pp. 23-30, 18 pgs.

Office Action corresponding application No. JP2015-231214 dated Jan. 19, 2016; 11 pgs.

Office Action issued on Nov. 26, 2019, in corresponding Japanese Application No. 2016-251096; 8 pages.

Office Action issued on May 26, 2020, in corresponding Japanese Application No. 2016-251096, 6 pages.

Office Action issued on Nov. 2, 2021, in connection with corresponding Japanese Application No. 2020-142151 (4 pages, including machine-generated English translation).

Office Action issued on May 9, 2023, in corresponding Japanese Application No. 2022-054932, 5 pages.

(56) References Cited

OTHER PUBLICATIONS

[Shironeko strategy] Let's master the basic operation of "Punicon", Famitsu App [online], Aug. 29, 2014, https://app.famitsu.com/20140829_431082/ [Date of retrieval: Apr. 27, 2023].

Office Action issued on Feb. 13, 2024, in corresponding Japanese Application No. 2022-054932, 11 pages.

Boomapp Games, "How to proceed with "White Cat Project" for new players!—Check out the 3rd "Basics of Operation"!", retrieved from https://game.boom-app.com/entry/shiropro-play-03>, Jul. 24, 2015, 17 pages.

Office Action issued on Jul. 2, 2024, in corresponding Japanese Application No. 2022-054932, 11 pages.

BoomappGames "How to play 'White Cat Project' for new players!—Part 3: Check out 'Basic Operation'!" retrieved from https://game.boom-app.com/entry/shiropro-play-03, Jul. 24, 2015, 7 pages.

Famitsu App "[White Cat Strategy] Master the basic controls of 'Punicon" retrieved from https://app.famitsu.com/20140829_431082/, Aug. 29, 2014, 14 pages.

* cited by examiner

PROGRAM, GAME CONTROL METHOD, AND INFORMATION PROCESSING APPARATUS

CROSS-REFERENCE TO RELATED APPLICATIONS

This application claims priority from U.S. patent application Ser. No. 17/690,571, filed on Mar. 9, 2022, entitled "PROGRAM, GAME CONTROL METHOD, AND INFORMATION PROCESSING APPARATUS," which in turn claims priority from U.S. patent application Ser. No. 17/014,226, now U.S. Pat. No. 11,305,189, filed on Sep. 8, 2020, entitled "PROGRAM, GAME CONTROL METHOD, AND INFORMATION PROCESSING APPARATUS," which in turn claims priority from U.S. patent application Ser. No. 16/371,352, now U.S. Pat. No. 10,799,794, filed on Apr. 1, 2019, entitled "PROGRAM, GAME CONTROL METHOD, AND INFORMATION PROCESSING APPARATUS," which in turn claims priority from U.S. patent application Ser. No. 15/279,904, now U.S. Pat. No. 10,293,253, filed on Sep. 29, 2016, entitled "PROGRAM, GAME CONTROL METHOD, AND INFORMATION PROCESSING APPARATUS," which in turn claims priority from Japanese Patent Application No. JP2015-231214, filed on Nov. 27, 2015, and Japanese Patent Application No. JP2016-102784, filed on May 23, 2016, the entire contents of which are hereby incorporated by reference.

BACKGROUND OF THE INVENTION

Field of the Invention

The invention relates to a program, a game control method, and an information processing apparatus.

Background Art

In the past, a game in which a character arranged in a virtual space is moved according to a user operation has been known. For example, a game in which a user character is moved on a map according to a user operation, and when the user character encounters an enemy character, the user character fights a battle against the enemy character is disclosed in JP-A-11-179048.

In recent years, a game is executed, for example, in an information processing apparatus equipped with a touch panel such as a smart phone. However, when an operation of a game is performed using a touch panel, there are cases in which operability is not sufficient. For example, in a game in which a character is moved in a moving direction determined according to a swipe operation in which the user moves his/her finger while contacting with a touch panel, there are cases in which the character is moved in the moving direction that is not intended by the user due to delicate position deviation of the swipe operation. Thus, there is room for improvement in operability of a game.

In light of the foregoing, it is an object of the invention to provide a program, a game control method, and an information processing apparatus, which are capable of improving operability of a game.

SUMMARY OF THE INVENTION

In order to solve the above problem, a non-transitory program with computer executable instructions which, when executed, according to the invention causes an information processing apparatus that executes a game carry out the steps of:

a step of causing an object arranged on a field object in a virtual space in which a world coordinate system having a first axis and a second axis is set to be displayed on a screen in which a screen coordinate system having a third axis and a fourth axis is set, a step of detecting a first user operation, a step of detecting first and second positions on the screen according to the first user operation while the first user operation is being detected, and a first moving step of moving the object relatively to the object in the virtual space according to the detected first user operation, wherein in the first moving step, a first speed component serving as a first axis direction component of a moving speed of the object is set according to a third axis direction component of a distance between the first position and the second position, and a second speed component serving as a second axis direction component of the moving speed of the object is set according to a fourth axis direction component of a distance between the first position and the second position, and the first speed component when the third axis direction component of the distance between the first position and the second position is a predetermined value is different from the second speed component when the fourth axis direction component of the distance between the first position and the second position is the predetermined value.

A game control method according to the invention is a game control method performed by an information processing apparatus and includes a step of causing an object arranged on a field object in a virtual space in which a world coordinate system having a first axis and a second axis is set to be displayed on a screen in which a screen coordinate system having a third axis and a fourth axis is set, a step of detecting a first user operation, a step of detecting first and second positions on the screen according to the first user operation while the first user operation is being detected, and a first moving step of moving the object relatively to the object in the virtual space according to the detected first user operation, wherein in the first moving step, a first speed component serving as a first axis direction component of a moving speed of the object is set according to a third axis direction component of a distance between the first position and the second position, and a second speed component serving as a second axis direction component of the moving speed of the object is set according to a fourth axis direction component of a distance between the first position and the second position, and the first speed component when the third axis direction component of the distance between the first position and the second position is a predetermined value is different from the second speed component when the fourth axis direction component of the distance between the first position and the second position is the predetermined value.

An information processing apparatus according to the invention is an information processing apparatus that executes a game, and includes
  a display unit that displays a screen, and
  a control unit,
  wherein the control unit
  causes an object arranged on a field object in a virtual space in which a world coordinate system having a first axis and a second axis is set to be displayed on a screen in which a screen coordinate system having a third axis and a fourth axis is set,
  detects a first user operation,
  detects first and second positions on the screen according to the first user operation while the first user operation is being detected, and
  performs a movement process of moving the object relatively to the object in the virtual space according to the detected first user operation,
  in the movement process, a first speed component serving as a first axis direction component of a moving speed of the object is set according to a third axis direction component of a distance between the first position and the second position, and a second speed component serving as a second axis direction component of the moving speed of the object is set according to a fourth axis direction component of a distance between the first position and the second position, and
  the first speed component when the third axis direction component of the distance between the first position and the second position is a predetermined value is different from the second speed component when the fourth axis direction component of the distance between the first position and the second position is the predetermined value.

According to a program, a game control method, and an information processing apparatus of the invention, operability of a game is improved.

DETAILED DESCRIPTION OF THE INVENTION

Hereinafter, exemplary embodiments of the invention will be described.

Figure 1:
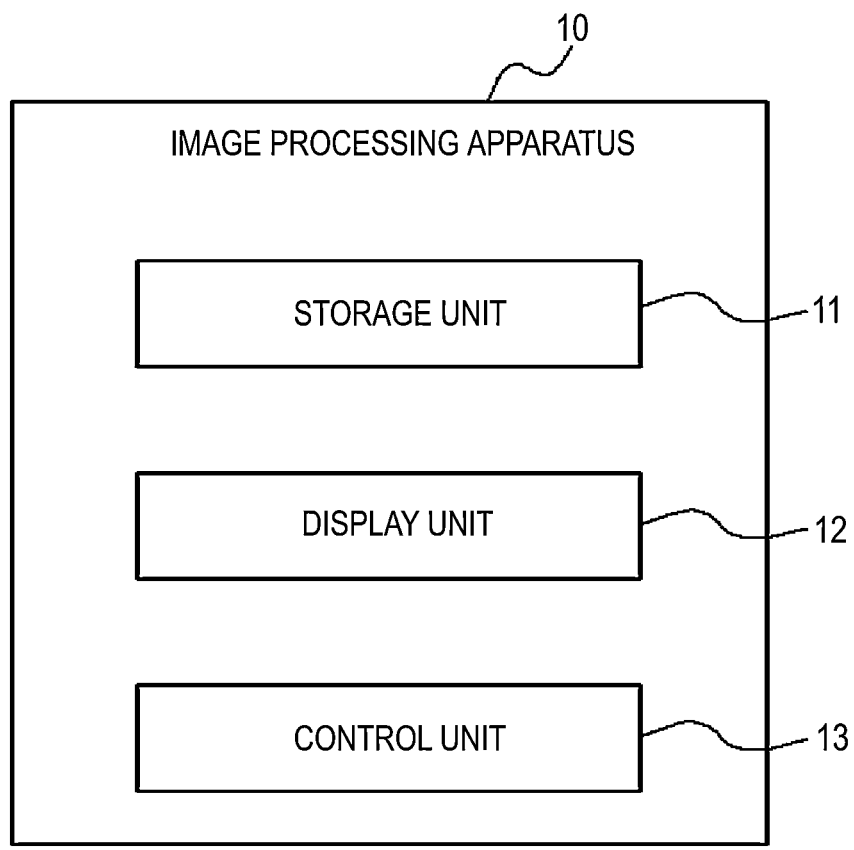
FIG. 1 is a block diagram illustrating a game system according to the invention.

First, an information processing apparatus 10 according to the invention will be described with reference to FIG. 1. Examples of the information processing apparatus 10 include a smart phone, a PC, and a game machine and can execute a game application according to the present embodiment. For example, the game application may be received from a predetermined application delivery server via the Internet or may be stored in a storage apparatus with which the information processing apparatus 10 is equipped or a storage medium such as a memory card readable by the information processing apparatus 10.

Here, an overview of a game according to the present embodiment will be described. For example, the game according to the present embodiment may be a game in which a game content is moved on a field in a game such as a role playing game or a simulation game.

A game content is electronic data used in a game, and includes, for example, an arbitrary medium such as a card, an item, a character, an avatar, and an object. The game content is electronic data that can be acquired, owned, used, managed, exchanged, combined, enhanced, sold, discarded, and/or detonated by the user in a game, but a use form of the game content is not limited to ones described in this specification.

Hereinafter, a "game content owned by the user" indicates a game content associated with a user ID of the user except when explicitly stated otherwise. "Providing a game content to the user" indicates associating the game content with the user ID. "Discarding a game content owned by the user" indicates canceling an association between the user ID and the game content. "Consuming a game content owned by the user" indicates causing any effect or influence to happen in a game according to cancellation of an association between a user ID and a game content. "Selling a game content owned by the user" indicates cancelling an association between a user ID and a game content and then associating a user ID with another game content (for example, virtual currency or an item). "Assigning a game content owned by a user A to a user B" indicates canceling an association between a user ID of the user A and a game content and then associating a user ID of the user B with the game content.

The game according to the present embodiment roughly includes a first game part, a second game part, and a third game part.

In the first game part, the user conducts a game while exploring a field in a game by operating the user character. Specifically, the user character moves on the field according to the user operation. For example, various areas such as a town and a dungeon are disposed in the field, and various events according to an area such as a conversation with a resident character in a town and a battle against an enemy character encountered in a dungeon happen. As an event happens, a main story of a game progresses. In the first game part, for example, when the user wins the battle against the enemy character, for example, the game content such as an item, virtual currency, or a character may be provided to the user. The provided game content can be used, for example, in the third game part which will be described later.

As will be described later, a path along which the user character is movable is disposed in the field according to the present embodiment. Specifically, a plurality of paths (horizontal paths) extending in substantially parallel to one direction (for example, a horizontal direction) of a screen and a plurality of paths (vertical paths) connecting two horizontal paths extending in another direction (for example, a vertical direction) of the screen are disposed. As will be described later, in the present embodiment, the user character moves on the game field along the horizontal path at a moving speed according to a predetermined user operation. On the other hand, the user character moves on the game field along the vertical path by a predetermined distance, for example, a distance from one horizontal path to another horizontal path. As described above, in the present embodiment, a process of moving the user character when the user character moves along the horizontal path differs from that when the user character moves along the vertical path. The process of moving the user character will be described later in detail.

In the second game part, the user collects various game media such as an item, virtual currency, and a character. Specifically, when the user character is moved to a specific area such as a mine or a fishing hole disposed on the field, or a game content such as a specific character or object is selected (for example, a touch operation on the screen) is selected, a sub event in which the game content can be acquired is generated. The sub event includes, for example, the progress of a sub story or execution of a mini game, but content of the sub event is not limited thereto. Various game media can be provided to the user according to an execution result of the sub event. The provided game content can be used, for example, in the third game part which will be described later.

In the third game part, for example, the user enhances the user character. Specifically, as the game content provided in the first game part and the second game part as described above is consumed, various game parameters of the user character change. The game parameter includes, for example, a level, a HP, offensive power, defensive power, an attribute, and a skill of the user character but is not limited thereto. The user character is enhanced according to a change in the game parameter of the user character. The enhancement of the user character increases a probability that the user character can win the battle against the enemy character in the first game part.

As described above, in the game according to the present embodiment, the user repeatedly performs the first game part, the second game part, and the third game part.

Next, respective components of the information processing apparatus 10 will be described. The information processing apparatus 10 includes a storage unit 11, a display unit 12, and a control unit 13.

The storage unit 11 is, for example, a storage apparatus and stores various information and programs necessary for a process of a game. For example, the storage unit 11 stores a game application.

The storage unit 11 stores various images (texture images) that are to be projected (texture mapped) on various objects arranged in a three dimensional virtual space.

For example, the storage unit 11 stores an image of the user character. Hereinafter, the user character is referred to as a "first game content," and an object onto which an image of the first game content is projected is referred to as a "first object."

The storage unit 11 stores, for example, an image of a building, a wall, a tree, or a non player character (NPC). Hereinafter, a building, a wall, a tree, an NPC, and the like are referred to as a "second game content," and an object onto which an image of the second game content is projected is referred to as a "second object."

The storage unit 11 stores, for example, an image (a background image) of a background such as the sky or a distant view. The background image is projected onto a background object which will be described later.

The storage unit 11 stores an image (a field image) of the field (for example, a ground surface). The field image is projected onto the field object which will be described later. The field object onto which the image of the field is projected is used as a virtual field (a ground surface) in a game.

Figure 2:
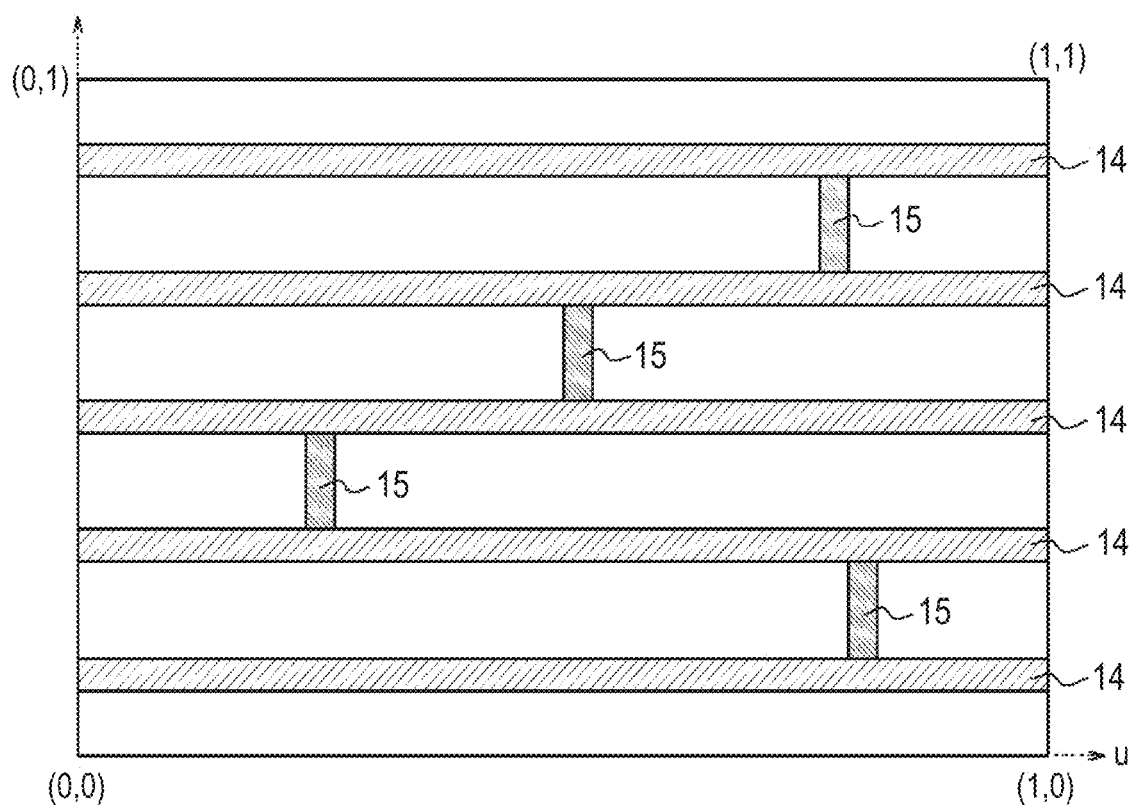
FIG. 2 is a diagram illustrating an example of a field image.

Here, a texture coordinate system having an u axis and a v axis which are orthogonal to each other is set in the field image, for example, as illustrated in FIG. 2. In the present embodiment, a plurality of first regions 14 corresponding to a plurality of horizontal paths in which the first game content is movable and one or more second regions 15 corresponding to one or more vertical paths are set in the field image. As will be described later, the first region 14 and the second region 15 projected onto the field object are set in the horizontal path and the vertical path, respectively.

The storage unit 11 stores correspondence information in which the second object is associated with texture coordinates of the field image. As will be described later, the correspondence information is used by the control unit 13 that performs a process of arranging the second game content on the field object.

The display unit 12 is, for example, a display device such as a liquid crystal display or an organic EL display and displays various screens.

The display unit 12 is configured with, for example, a touch panel, and functions as an interface that detects various user operations.

For example, the display unit 12 can detect a tap operation, a long tap operation, a flick operation, and a swipe operation of the user. The tap operation is an operation in which the user touches the display unit 12 with a finger and then takes the finger off. The long tap operation is an operation in which the user touches the display unit 12 with a finger and then holds without moving the finger touching the display unit 12. The flick operation is an operation in which the user touches the display unit 12 with a finger and then takes the finger off while moving the finger touching the display unit 12. The swipe operation is an operation in which the user touches the display unit 12 with a finger and then holds the finger touching the display unit 12 movably. Preferably, the display unit 12 can detect the above-described operation (for example, a multi-tap operation) performed by the user using a plurality of fingers.

The control unit 13 is a dedicated microprocessor or a CPU that reads a specific program and implements a specific function. The control unit 13 controls an operation of the information processing apparatus 10 in general. For example, the control unit 13 executes the game application according to the user operation on the display unit 12. The control unit 13 executes various processes related to a game.

For example, the control unit 13 causes the field object and the screen (the field screen) on which the first object is displayed to be displayed on the display unit 12. The control unit 13 causes the first object in the virtual space to move on the field object, relatively to the field object according to a predetermined user operation on the field screen. A specific example will be described below.

Figure 3:
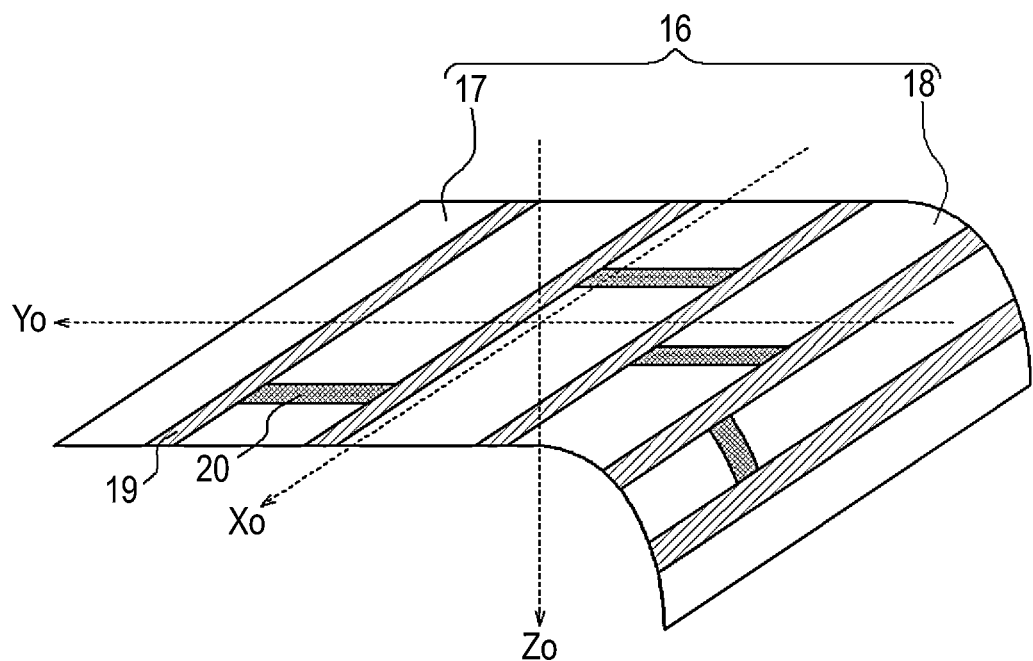
FIG. 3 is a perspective diagram illustrating a schematic shape of a field object.

First, a field object 16 will be described with reference to FIG. 3. The field object 16 is configured with a plurality of object elements (for example, a polygonal plane mesh). An object coordinate system having an Xo axis, a Yo axis, and a Zo axis that are orthogonal to one another is set in the field object 16. In the present embodiment, the field object 16 has a shape in which a cross-sectional shape in an arbitrary plane substantially parallel to a Yo-Zo plane extends in an Xo axis direction and is, for example, a sheet-like object having substantially no thickness. In the present specification, the cross-sectional shape of the object includes a shape related to a cross-sectional shape of a object having substantially no thickness such as a straight line, a curved line, or a combination thereof. The shape in which the cross-sectional shape extends includes a shape of the field object 16 obtained by adding, modifying or deleting an object element to or of the field object 16 in which the cross-sectional shape has extended. For example, both the shape of the field object 16 obtained by forming a concave-convex shape corresponding to a virtual "mountain" or "valley" on the field object 16 illustrated in FIG. 3 and the shape of the field object 16 obtained by deleting some object elements from the field object 16 illustrated in FIG. 3 are included in the "shape in which the cross-sectional shape extends." The field object 16 includes a first portion 17 and a second portion 18.

The first portion 17 has substantially a planar shape in the present embodiment and is disposed on an Xo-Yo plane. The shape of the first portion 17 is limited to a planar shape and may be, for example, a shape in which a cross-sectional shape of the first portion 17 in an arbitrary plane substantially parallel to the Yo-Zo plane has an arbitrary curvature. In this case, the first portion 17 is disposed, for example, such that an end portion of the first portion 17 in a -Yo direction is positioned on the Xo-Yo plane.

The second portion 18 is a portion (an inclined portion) that extends from an end of the first portion 17, for example, in the -Yo direction and is inclined to one surface side (for example, the +Zo side) of the Xo-Yo plane. In the present embodiment, the second portion 18 is configured with a plurality of object elements but may be configured, for example, as a substantially curved surface by sufficiently decreasing the size of each object element. Alternatively, each of object elements constituting the second portion 18 may be a curved surface.

Here, the control unit 13 projects the field object 16 onto the field image. The projection of the field image is performed, for example, by texture mapping. Specifically, the control unit 13 maps points (texture coordinates) on the field image with a plurality of apexes (object coordinates) on the field object 16, and projects the field image onto the field object 16. Here, an apex is, for example, an apex in a mesh serving as an object element constituting an object.

As described above, the field object 16 onto which the field image is projected is used as a virtual field (ground surface) in a game. The first region 14 and the second region 15 on the field image projected onto the field object 16 are set in a horizontal path 19 and a vertical path 20 in which the first game content is movable. In the present embodiment, for example, as illustrated in FIG. 3, a plurality of horizontal paths 19 extend in substantially parallel to the Xo axis of the object coordinate system. Each of a plurality of vertical paths 20 extends between two of the horizontal paths 19 and connects the two horizontal paths 19. Preferably, the length of the horizontal path 19 in the longitudinal direction (for example, the length in the Xo axis direction) is larger than the length of the vertical path 20 in the longitudinal direction (for example, the length in the Yo axis direction).

Figure 4:
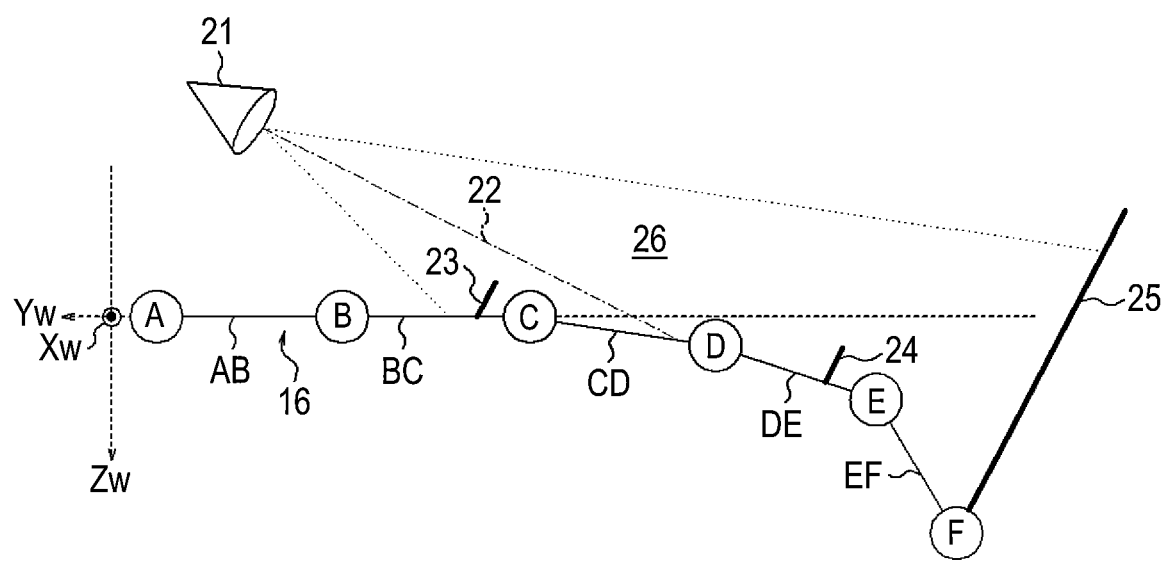
FIG. 4 is a cross-sectional diagram obtained by cutting a field object arranged in a virtual space along a plane substantially parallel to a Yw-Zw plane.

Then, the control unit 13 arranges the field object 16 in three dimensional virtual space, for example, as illustrated in FIG. 4. In FIG. 4, for the sake of convenience of description, only six apexes A to F associated with the field object 16 are illustrated, but an arbitrary number of apexes may be set. Here, a world coordinate system having an Xw axis (a first axis), a Yw axis (a second axis), and a Zw axis that are orthogonal to one another is set in the virtual space. For example, the control unit 13 arranges the field object 16 in the virtual space, for example, so that the Xo axis and the Yo axis of the field object 16 are identical to the Xw axis and the Yw axis of the virtual space, respectively. Thus, the second portion 18 (object elements CD, DE, and EF in FIG. 4) of the field object 16 arranged in the virtual space exist on one surface side (for example, a +Zw side) of the virtual space.

Then, the control unit 13 arranges a virtual camera 21 in the virtual space. As will be described later, the virtual camera 21 is used for a process of generating the field screen. In the present embodiment, the virtual camera 21 is arranged on the other surface side (for example, a -Zw side) of an Xw-Yw plane of the virtual space so that an optical axis 22 of the virtual camera 21 is substantially parallel to a Yw-Zw plane. In this case, the second portion 18 of the field object 16 is inclined downwards when viewed from the virtual camera 21 as it gets away in the direction of the optical axis 22 of the virtual camera 21. Preferably, the virtual camera 21 is arranged so that the optical axis 22 intersects with the field object.

Then, the control unit 13 arranges a first object 23 onto which the image of the first game content is projected, a second object 24 onto which the image of the second game content is projected, and a background object 25 onto which the background image is projected in the virtual space.

The first object 23 is arranged at an arbitrary position of the field object 16 within a field of view 26 of the virtual camera 21. In the present embodiment, the first object 23 is arranged on the first portion 17 of the field object 16. The first object 23 is, for example, an planar shaped object having no thickness. The first object 23 is arranged so an image projection plane satisfies a predetermined condition for the optical axis 22 of the virtual camera 21 (for example, so that the image projection plane is substantially vertical to the optical axis 22).

The second object 24 is arranged at a predetermined position on the field object 16. Specifically, the control unit 13 reads the correspondence information in which the second object 24 is associated with the texture coordinates of the field image from the storage unit 11. Then, the control unit 13 arranges the second object 24 at positions (object coordinates) on the field object 16 corresponding to the texture coordinates associated with the second object 24 based on the correspondence information. The object coordinates of the field object 16 corresponding to the texture coordinates associated with the second object 24 are uniquely set through the texture mapping. In the present embodiment, the second object 24 is, for example, a planar shaped object having no thickness. The second object 24 is arranged so that the image projection plane satisfies a predetermined condition for the optical axis 22 of the virtual camera 21 (for example, so that the image projection plane is substantially vertical to the optical axis 22).

The background object 25 is arranged in the virtual space so that at least a part of the background object 25 is included in the field of view 26 of the virtual camera 21. In the present embodiment, the background object 25 is arranged to contact with an end portion (the apex F in FIG. 4) in the −Yw direction of the virtual space. The background object 25 is, for example, a planar shaped object having no thickness. The background object 25 is arranged so that the image projection plane satisfies a predetermined condition for the optical axis 22 of the virtual camera 21 (for example, so that the image projection plane satisfies is substantially vertical to the optical axis 22).

Figure 5:
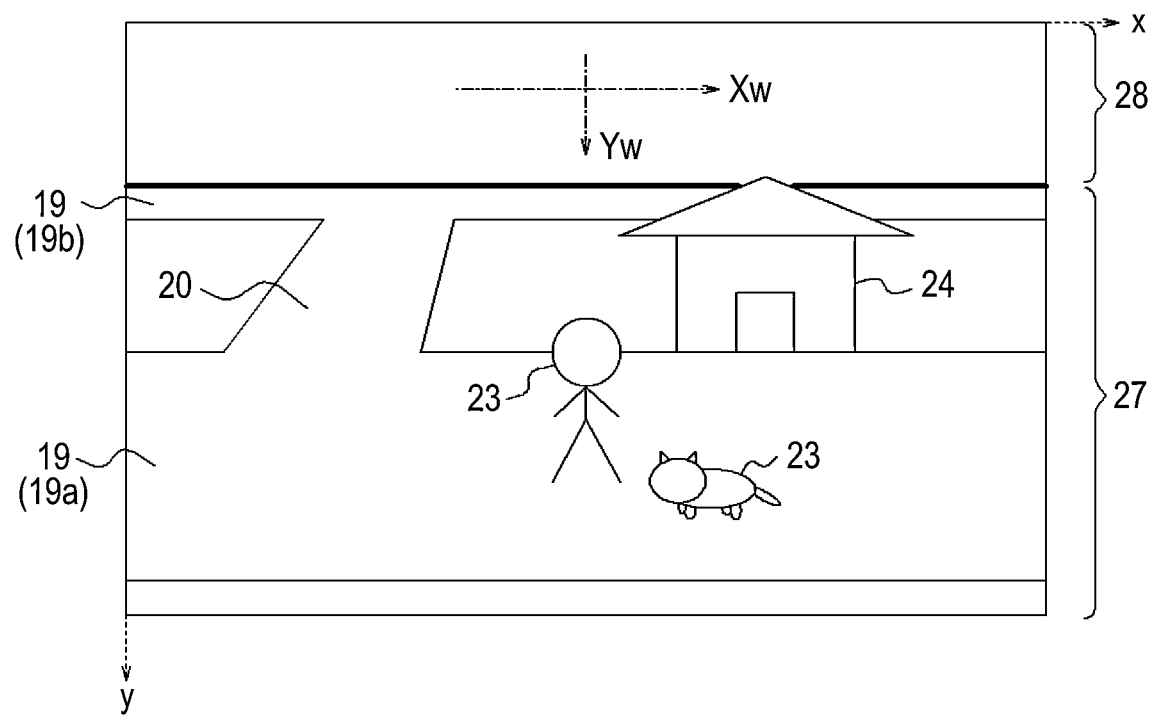
FIG. 5 is a diagram illustrating an example of a field screen.

Then, the control unit 13 causes the field screen looking toward the virtual space using the virtual camera 21 as a point of view to be displayed on the display unit 12. A screen coordinate system including an x axis (a third axis) and a y axis (a fourth axis) that are orthogonal to each other is set in the field screen, for example, as illustrated in FIG. 5. In the present embodiment, an x axis direction is substantially identical to a longitudinal direction (for example, a horizontal direction in FIG. 5) of the field screen, and a y axis direction is substantially identical to a short direction (for example, a vertical direction in FIG. 5) of the field screen. The x axis direction of the field screen is substantially identical to an Xw axis direction of the virtual space.

As described above, at least a part of the field object 16, a part of the background object 25, the first object 23, and the second object 24 are included in the field of view 26 of the arranged virtual camera 21, for example, arranged as illustrated in FIG. 4. In this case, the field screen displayed on the display unit 12 includes a field region 27 and a background region 28, for example, as illustrated in FIG. 5.

The field region 27 is a region on which the field object 16 is displayed and corresponds to the field (the ground surface) in the virtual space. The background region 28 is a region on which the background object 25 is displayed and corresponds to, for example, the sky or the distant view in the virtual space. Here, the field region 27 is disposed at the lower side of the field screen (the +y direction side in the present embodiment), and the background region 28 is disposed at the upper side (the −y direction side in the present embodiment). A boundary between the field region 27 and the background region 28 corresponds to, for example, a horizon in the virtual space.

The horizontal path 19 and the vertical path 20 can be displayed in the field region 27. Two horizontal paths 19a and 19b and one vertical path 20 connecting the two horizontal paths 19a and 19b are illustrated in FIG. 5.

The first object 23 is displayed on the field screen. In FIG. 5, there are two first objects 23 on the horizontal path 19a, but there may be an arbitrary number of first objects 23. As will be described later, the control unit 13 moves the first object 23 relatively to the field object 16 according to a predetermined user operation on the field screen.

All the second objects 24 included in the field of view 26 of the virtual camera 21 are displayed on the field screen. One second object 24 (a building) is illustrated in FIG. 5.

As described above, the first object 23, the second object 24, and the background object 25 are planar shaped objects and arranged substantially vertically to the optical axis 22 of the virtual camera 21 (see FIG. 4). Thus, the first object 23, the second object 24, and the background object 25 are displayed on the field screen substantially in parallel to the field screen (that is, an object projection plane faces a screen direction) (see FIG. 5).

Then, the control unit 13 moves the first object 23 on the field object 16 relatively to the field object 16 according to a predetermined user operation on the field screen. Here, the moving relatively includes moving at least one of the first object 23 and the field object 16 in the virtual space. In the present embodiment, the control unit 13 moves the first object 23 relatively to the field object 16 by moving the field object 16 (that is, changing world coordinates of the field object 16) without substantially moving the first object 23 (that is, without substantially changing world coordinates of the first object 23).

Here, commonly, the display unit 12 with which the information processing apparatus 10 is equipped has the longitudinal direction (for example, the horizontal direction) and the short direction (for example, the vertical direction), and the field screen according to the present embodiment has the longitudinal direction and the short direction according to the shape of the display unit 12 as described above. Thus, on the field screen, there are an operation region that is relatively long (large) in the longitudinal direction and an operation region that is relative short (small) in the short direction.

As will be described later, the control unit 13 moves the first object 23 in a direction substantially parallel to an Xw-Zw plane of the first object 23 based on information obtained in the operation region that is relatively long in the longitudinal direction of the field screen among information obtained according to a first user operation. On the other hand, the control unit 13 moves the first object 23 in a direction substantially parallel to the Yw-Zw plane of the first object 23 based on information obtained in the operation region that is relatively short in the short direction of the field screen among the information obtained according to the first user operation.

An operation of the control unit 13 for moving the first object 23 on the field object 16 relatively to the field object 16 will be specifically described below.

First, an operation of the control unit 13 for moving the first object 23 relatively to the field object 16 in a direction substantially parallel to the Xw-Zw plane (a first plane) of the virtual space will be described. In the present embodiment, the first object 23 moves relatively to the field object 16 in the Xw axis direction of the virtual space. Here, the moving in the Xw axis direction indicates that the Xw axis direction component of the moving speed of the first object 23 is larger than zero.

Initially, the control unit 13 detects a predetermined user operation (the first user operation) on the field screen. The control unit 13 detects the first and second positions on the field screen according to the first user operation while the first user operation is being detected.

In the present embodiment, the first user operation is the swipe operation. The screen coordinates of the first position are screen coordinates corresponding to the position on the field screen that is initially designated by the swipe operation. The screen coordinates of the second position are screen coordinates corresponding to the position on the field screen that is currently designated by the swipe operation. Thus, in the present embodiment, the screen coordinates of the second position may change momentarily according to the first user operation. The first user operation is not limited to the swipe operation and may be an arbitrary operation of designating two points on the field screen. For example, the first user operation may be an operation (a long multi-tap operation) in which the user performs long tapping with two fingers. In this case, the screen coordinates of both of the first and second positions may change momentarily according to the first user operation. Hereinafter, a position vector of the second position having the first position as a reference point is also referred to as a "first input vector."

Then, the control unit 13 determines the moving speed of the first object 23 along the Xw axis according to the x axis direction component of the distance between the first position and the second position (that is, the absolute value of the x axis direction component of the first input vector). In the present embodiment, as the x axis direction component of the distance between the first position and the second position increases, the moving speed of the first object 23 along the Xw axis increases. The moving speed of the first object 23 along the Xw axis may change continuously or stepwise according to the x axis direction component of the distance between the first position and the second position. Here, an aspect in which the moving speed changes continuously may include an aspect in which a range of the axis direction component of the moving speed corresponding to each step is sufficiently small among aspects in which the moving speed changes stepwise.

Then, the control unit 13 determines a +Xw direction or a −Xw direction of the world coordinate system as the moving direction of the first object 23 according to whether a value obtained by subtracting an x coordinate of the second position from an x coordinate of the first position is positive or negative (that is, according to the direction of the x axis direction component of the first input vector). Then, the control unit 13 moves the first object 23 relatively to the field object 16 in the determined direction at the determined moving speed.

In the present embodiment, when the direction of the x axis direction component of the first input vector is an +x direction, the control unit 13 determines the +Xw direction of the world coordinate system as the moving direction of the first object 23. Then, the control unit 13 moves the field object 16 in the virtual space in parallel to the −Xw direction without substantially moving the first object 23 in the virtual space. On the other hand, when the direction of the x axis direction component of the first input vector is an −x direction, the control unit 13 determines the −Xw direction of the world coordinate system as the moving direction of the first object 23. Then, the control unit 13 moves the field object 16 in the virtual space in parallel to the +Xw direction without substantially moving the first object 23 in the virtual space.

Figure 6:
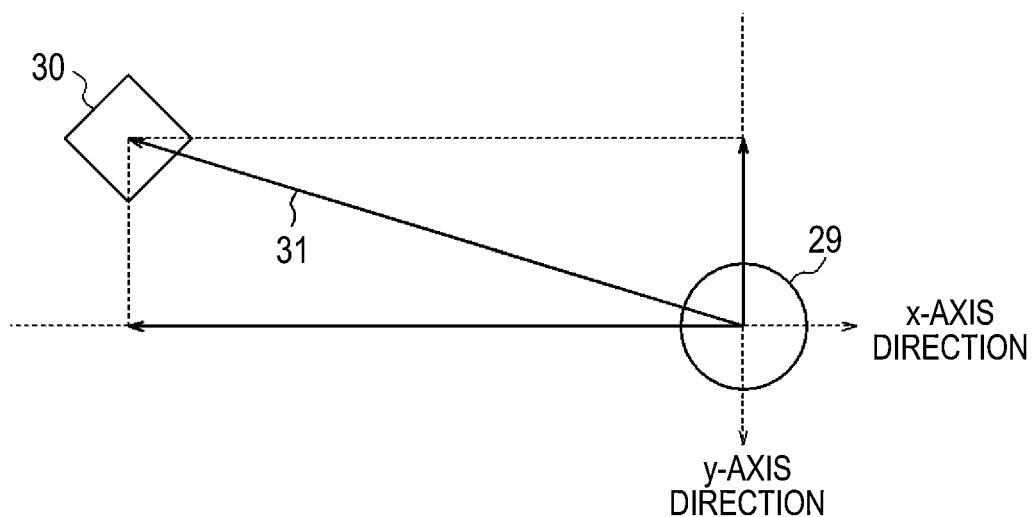
FIG. 6 is a diagram illustrating examples of first and second positions determined according to a first user operation on the field screen of FIG. 5.
Figure 7:
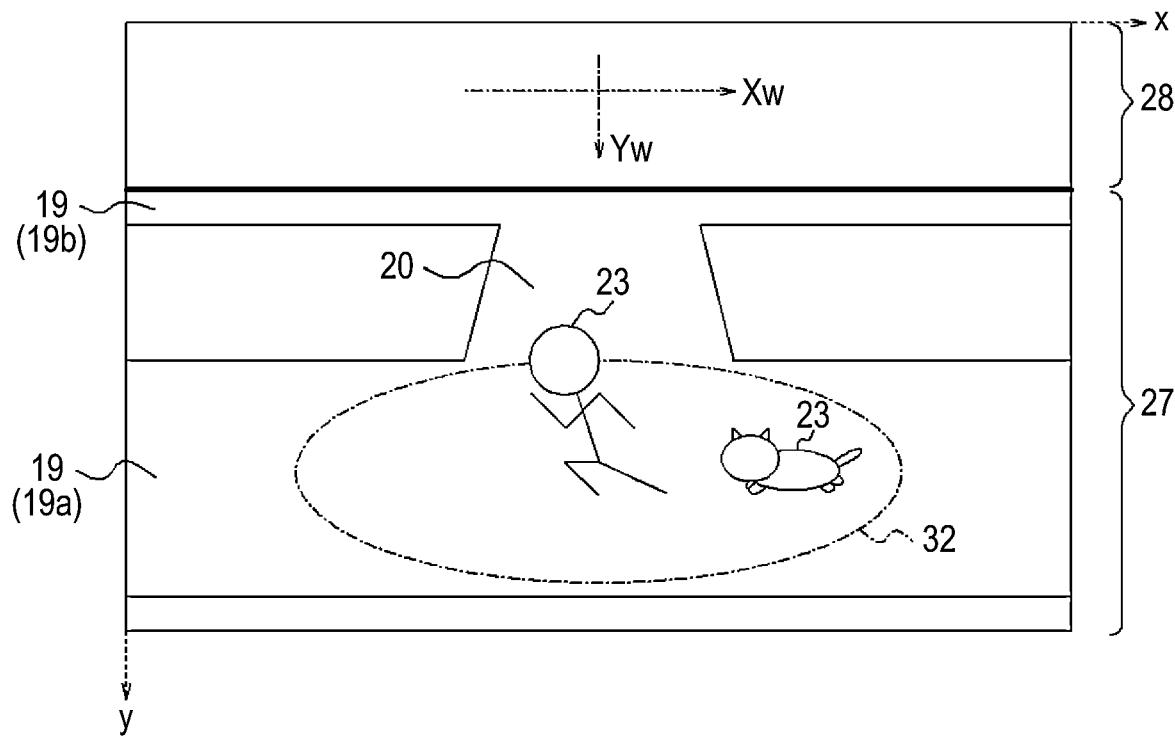
FIG. 7 is a diagram illustrating an example of a field screen, that is, an example in which a game content is moving in an Xw axis direction.

Here, the operation of the control unit 13 will be specifically described with reference to FIGS. 5 to 7. For example, the control unit 13 detects the first and second positions while the first user operation is being detected in the state in which the field screen illustrated in FIG. 5 is displayed on the display unit 12. For example, when a second position 30 is positioned at the left upper side of a first position 29 on the field screen as illustrated in FIG. 6, a direction of the x axis direction component of the first input vector 31 is an −x direction. Thus, the control unit 13 moves the field object 16 in the virtual space in parallel to the +Xw direction without substantially moving the first object 23 in the virtual space. At this time, on the field screen, for example, as illustrated in FIG. 7, the position (screen coordinates) of the first object 23 does not substantially change, and the display is performed such that the field object 16 and the background object 25 displayed on the field region 27 and the background region 28 flow toward the right direction (the +x direction) of the screen.

Preferably, when the end of the first user operation (for example, an operation in which the user who perform the swipe operation takes the finger off the display unit 12) is detected, the control unit 13 moves the first object 23 in the Xw axis direction while changing the moving speed of the first object 23. In the present embodiment, when the end of the first user operation is detected, the control unit 13 moves the first object 23 while reducing the moving speed of the first object 23 at a predetermined time rate of change. Through this configuration, even when the user takes the finger off the display unit 12, the first object 23 continuously moves in the Xw axis direction at the reduced speed, and thus an operation burden on the user who desires to cause the first object 23 to move a relatively long distance along the horizontal path 19 can be reduced, and the operability of the game is improved.

Here, the time rate of change of the moving speed of the first object 23 may be a constant or may be calculated by the control unit 13. For example, the control unit 13 may calculate the time rate of change according to the moving speed of the first object 23 so that the time rate of change increases or decreases as the moving speed of the first object 23 increases. For example, a predetermined parameter indicating a characteristic of the first game content such as a weight or rapidity is set in the first object 23, and the control unit 13 may calculate the time rate of change according to the parameter so that the time rate of change of the moving speed of the first object 23 increases or decreases as the parameter increases. For example, a predetermined parameter indicating a state of the ground surface such as asphalt or mire is set in some regions on the field object 16, and the control unit 13 may calculate the time rate of change of the moving speed of the first object 23 according to the parameter.

Preferably, when a predetermined user operation (a second user operation) on the field screen is detected while the first object 23 is being moved while changing the moving speed as described above, the control unit 13 sets a predetermined value as the moving speed of the first object 23. In the present embodiment, the control unit 13 sets the moving speed of the first object 23 to zero as the second user operation is detected. Here, the second user operation is, for example, the tap operation performed at an arbitrary position on the field screen, but the second user operation may be, for example, an arbitrary user operation such as the multi-tap operation. Through this configuration, as described above, the user can change the moving speed of the first object 23 that moves in the Xw axis direction to a predetermined value at an arbitrary timing while changing the moving speed (for example, the user can stop the first object 23), and the operability of the game is improved.

Next, an operation of the control unit 13 for moving the first object 23 relatively to the field object 16 in a direction substantially parallel to the Yw-Zw plane (a second plane) of the virtual space will be described. In the present embodiment, the first object 23 moves the first object 23 relatively to the field object 16 in a Yw axis direction of the virtual space. Here, the moving in the Yw axis direction indicates that the Yw axis direction component of the moving speed of the first object 23 is larger than zero.

Initially, the control unit 13 determines whether or not the first object 23 is positioned within a predetermined region 32 nearby the vertical path 20. When the first object 23 is determined to be positioned within the region 32, the control unit 13 determines whether or not a predetermined condition (a first condition) related to a change in the second position according to the detected first user operation is satisfied.

In the present embodiment, the first condition is a condition that an absolute value of the y axis direction component of the distance between the second position before the change and the second position after the change, that is, an absolute value of the y axis direction component of the position vector (a second input vector) of the second position after the change having the second position before the change as the reference point is a predetermined threshold value or more or a condition that an absolute value of the y axis direction component of the change speed of the second position changing according to the first user operation (that is, the magnitude of the y axis direction component of the speed vector of the second position) is a predetermined threshold value or more.

Preferably, the first condition further includes a condition that, when the vertical path 20 corresponding to the region 32 is positioned in the −Yw direction relative to the first object 23 (for example, when the vertical path 20 extends toward the depth side on the field screen), a value obtained by subtracting a y coordinate of the second position after the change from a y coordinate of the second position before the change is negative (that is, a direction of the y axis direction component of the second input vector is a −y direction). Preferably, the first condition further includes a condition that, when the vertical path 20 corresponding to the region 32 is positioned in a +Yw direction relative to the first object 23 (for example, when the vertical path 20 extends toward the front side on the field screen), a value obtained by subtracting the y coordinate of the second position after the change from the y coordinate of the second position before the change is positive (that is, the direction of the y axis direction component of the second input vector is a +y direction).

Figure 8:
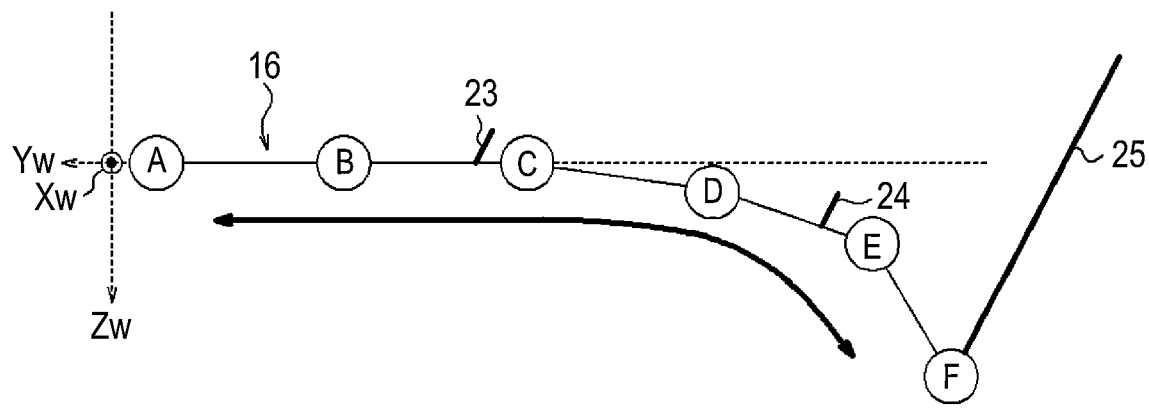
FIG. 8 is a cross-sectional diagram, which is obtained by cutting a field object along a plane substantially parallel to a Yw-Zw plane, illustrating an example in which a field object slides in a Yw axis direction.

When the first condition is determined to be satisfied, the control unit 13 moves the first object 23 relatively to the field object 16 in the direction substantially parallel to the Yw-Zw plane of the virtual space in the virtual space by a predetermined distance. Specifically, the control unit 13 lets the field object 16 to slide in the virtual space by a predetermined distance without substantially moving the first object 23 in the virtual space. When the field object 16 slides, an apex existing on a plane substantially parallel to the Yw-Zw plane among a plurality of apexes on the field object 16 moves along a predetermined trajectory on the plane. Here, a shape of the predetermined trajectory is substantially identical to a shape in which the cross-sectional shape of the field object 16 extends in the plane substantially parallel to the Yw-Zw plane. Thus, for example, in FIG. 8, when the field object 16 slides, each of the apexes A to F of the field object 16 in the plane substantially parallel to the Yw-Zw plane moves to slide along the cross-sectional shape of the field object 16. In other words, the control unit 13 moves the field object 16 while changing the shape of the field object 16. The predetermined distance is, for example, a length of the vertical path 20 in the longitudinal direction (the Yw axis direction in the present embodiment).

Preferably, the control unit 13 performs control such that the image projection plane of each of the first object 23, the second object 24, and the background object 25 satisfies the above-described condition for the optical axis 22 of the virtual camera 21 while the field object 16 is sliding (for example, such that the image projection plane is substantially vertical to the optical axis 22). Specifically, the control unit 13 performs control such that the projection plane of the first object 23 is substantially vertical to the optical axis 22 by changing, for example, an angle formed between the first object 23 and the field object 16 while causing the field object 16 to slide. Through this configuration, even when the field object 16 slides, the first object 23, the second object 24, and the background object 25 are displayed on the field screen to be substantially in parallel to the field screen (that is, so that the object projection plane faces the screen direction), and thus visibility of the field screen is improved.

Figure 9:
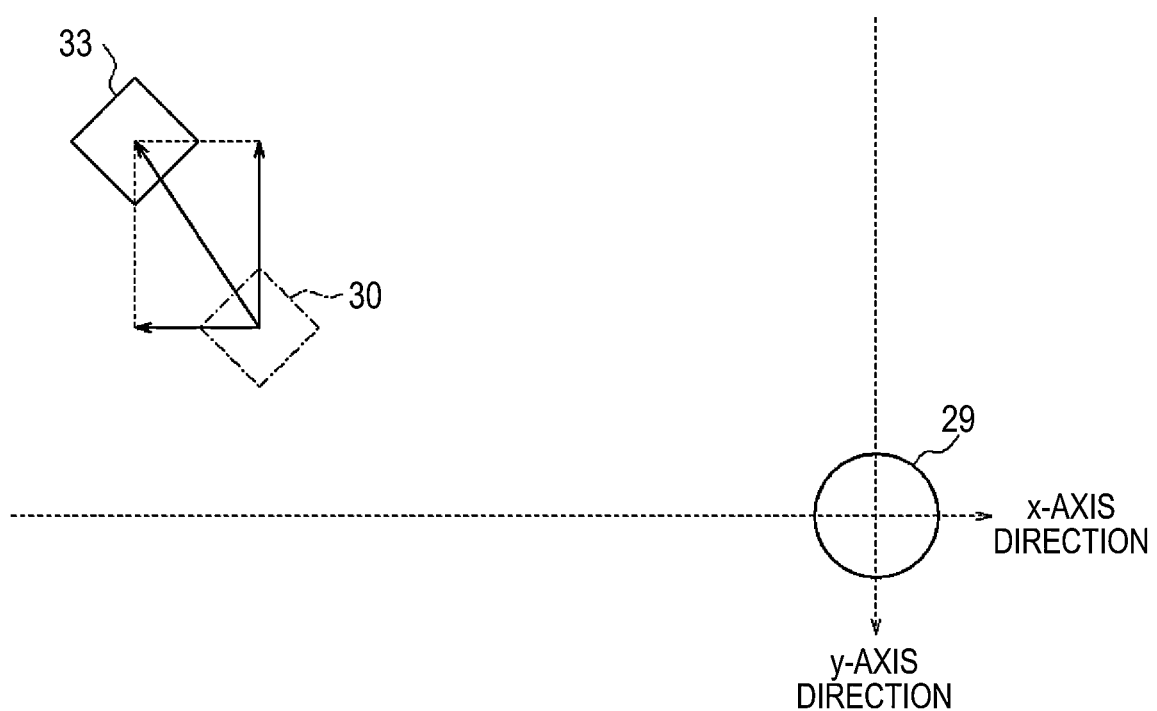
FIG. 9 is a diagram illustrating examples of first and second positions determined according to a first user operation on the field screen of FIG. 7.

Here, the operation of the control unit 13 will be specifically described with reference to FIGS. 7 to 11. For example, the control unit 13 detects the change in the second position according to the first user operation in the state in which the field screen illustrated in FIG. 7 is displayed on the display unit 12. Here, the first object 23 is positioned within the predetermined region 32 nearby the vertical path 20 positioned at the −Yw side of the world coordinate system relative to the first object 23. As illustrated in FIG. 9, a second position 33 after the change is assumed to be positioned at the left upper side of a second position 30 before the change, and the first condition related to the change in the second position is assumed to be satisfied.

Figure 10:
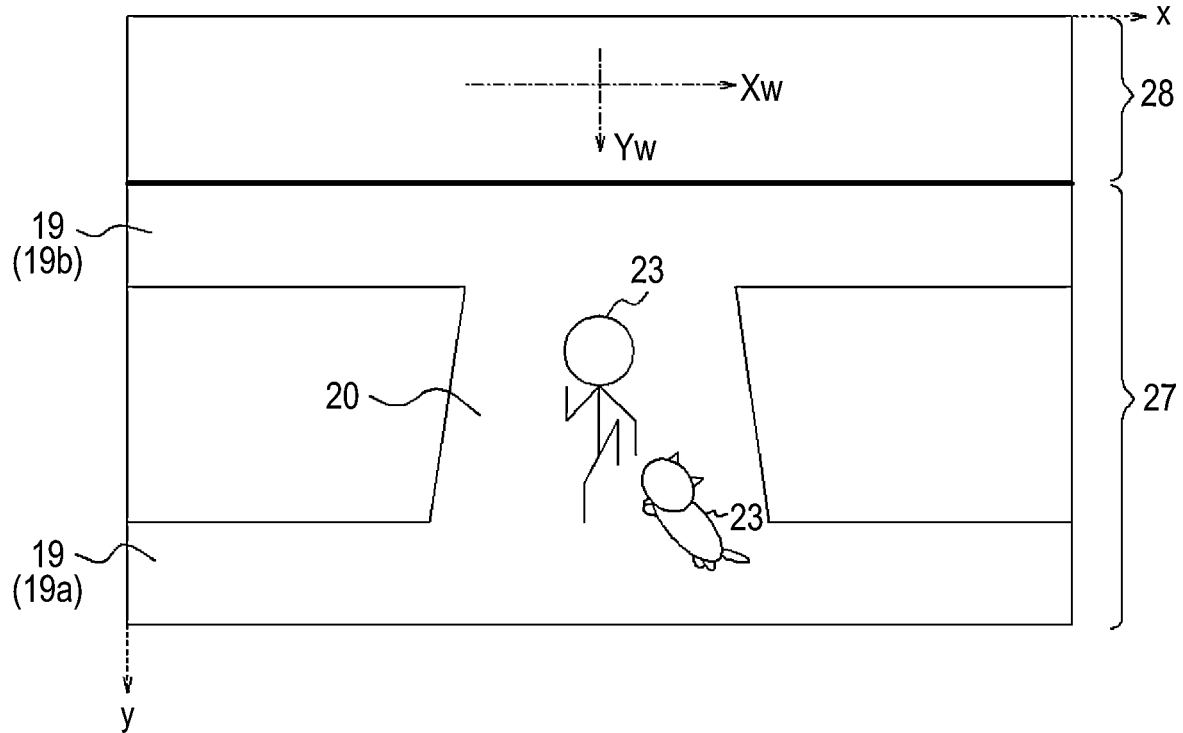
FIG. 10 is a diagram illustrating an example of a field screen, that is, an example in which a game content moves in a Yw axis direction.
Figure 11:
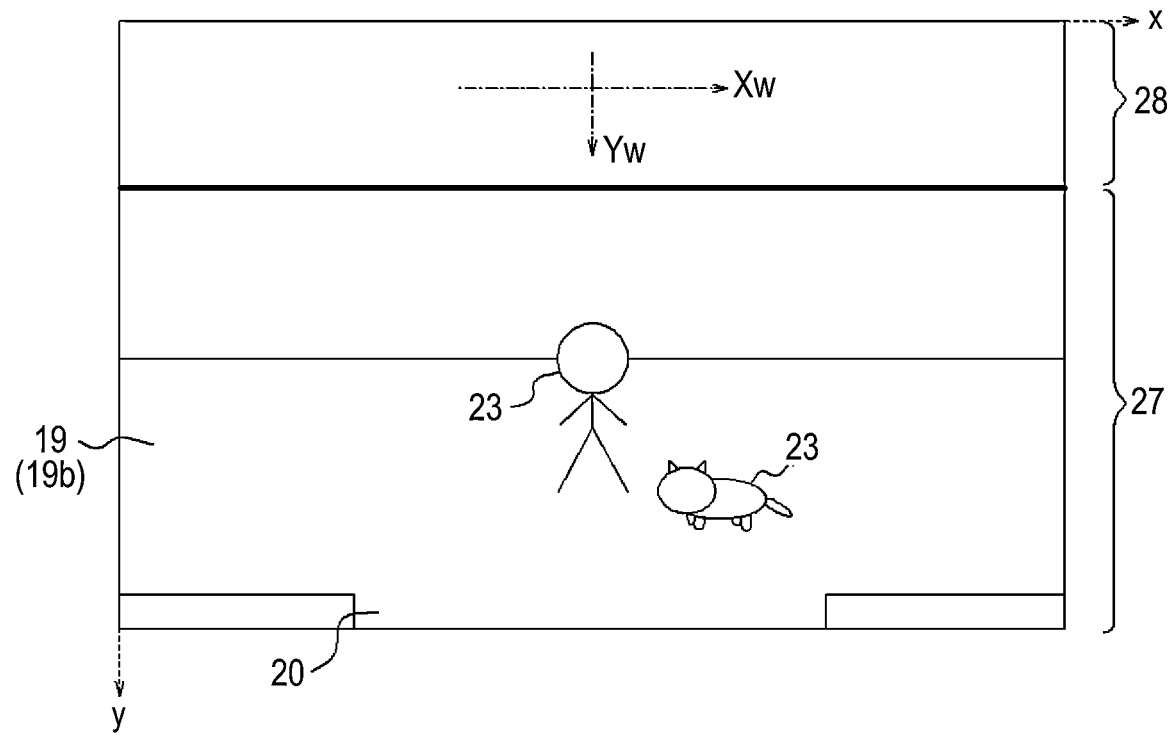
FIG. 11 is a diagram illustrating an example of a field screen, that is, an example in which a game content moves in a Yw axis direction by a predetermined distance.

In this case, the control unit 13 moves the first object 23 in the −Yw direction in the virtual space by a predetermined distance. Specifically, the control unit 13 causes the field object 16 to move in the virtual space in the +Yw direction by the length of the vertical path 20 in the longitudinal direction without substantially moving the first object 23 in the virtual space (see FIG. 8). At this time, on the field screen, for example, as illustrated in FIG. 10, the position (the screen coordinates) of the first object 23 does not substantially change, and the field object 16 slides toward the front side of the screen, and, for example, as illustrated in FIG. 11, the first object 23 moves up to another horizontal path 19b.

As a result, the control unit 13 moves the first object 23 on the field object 16 relatively to the field object 16 in the virtual space according to the user operation on the field screen.

The control unit 13 performs a process that differs according to the position of the first object 23 on the field object 16. For example, different regions (a first specific region and a second specific region) that are consecutive (adjacent) to each other in the Xo axis direction (which is identical to the Xw axis direction in the present embodiment) are set in the field object 16. The first object 23 is movable between the first specific region and the second specific region seamlessly (for example, without switching or turned off a display of the field screen). For example, the first specific region corresponds to the inside of a virtual town in a game, and the second specific region corresponds to the outside of the town. In this case, when the first object 23 stays in the first specific region, for example, the control unit 13 performs a process such as a conversation between the first object 23 (the user character) and the second object 24 (for example, an NPC serving as a resident on a street). On the other hand, when the first object 23 stays in the second specific region, for example, the control unit 13 performs a process such as a battle between the first object 23 (the user character) and the enemy character. For example, when the first object 23 stays in the first specific region, the control unit 13 may cause different music data (BGM) to be reproduced from when the first object 23 stays in the second specific region.

Figure 12:
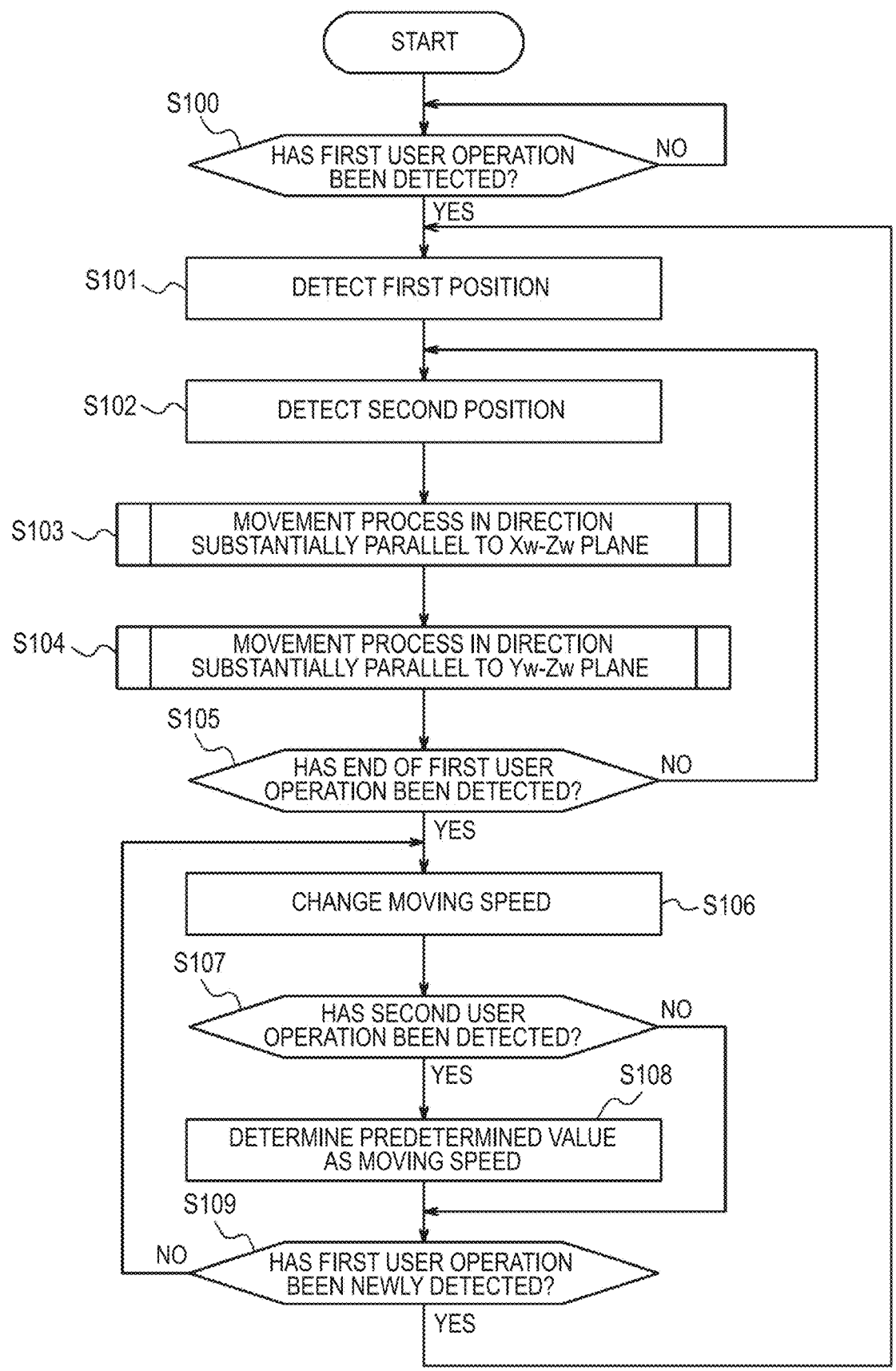
FIG. 12 is a flowchart illustrating an operation of an information processing apparatus.

Next, an operation of the information processing apparatus 10 will be described with reference to a flowchart illustrated in FIG. 12. The present operation is performed, for example, in a state in which the field screen is displayed while the first game part is being executed.

Step S100: First, the control unit 13 is on standby for detection of the first user operation on the field screen. The first user operation is, for example, the swipe operation. When the first user operation is detected (Yes in step S100), the process proceeds to step S101.

Step S101: Then, the control unit 13 detects the first position on the field screen according to the first user operation. The first position is, for example, the position (the screen coordinates) on the field screen which is initially designated by the swipe operation.

Step S102: Then, the control unit 13 detects the second position on the field screen according to the first user operation. The second position is, for example, the position (the screen coordinates) on the field screen which is currently designated by the swipe operation.

Step S103: Then, the control unit 13 performs the process of moving the first object 23 in the direction substantially parallel to the Xw-Zw plane based on the first and second positions. This process will be described later in detail.

Step S104: Then, the control unit 13 performs the process of moving the first object 23 in the direction substantially parallel to the Yw-Zw plane according to the change in the second position. This process will be described later in detail.

Step S105: Then, the control unit 13 determines whether or not the end of the first user operation has been detected. When the end of the first user operation is determined to have been detected (Yes in step S105), the process proceeds to step S106. On the other hand, when the end of the first user operation is determined not to have been detected (No in step S105), the process returns to step S102.

Step S106: when the end of the first user operation is determined to have been detected in step S105 (Yes in step S105), the control unit 13 moves the first object 23 in the Xw axis direction while changing (for example, reducing) the moving speed of the first object 23.

Step S107: Then, the control unit 13 determines whether or not the second user operation has been detected. The second user operation is, for example, the tap operation performed at an arbitrary position on the field screen. When the second user operation is determined to have been detected (Yes in step S107), the process proceeds to step S108. On the other hand, when the second user operation is determined not to have been detected (No in step S107), the process proceeds to step S109.

Step S108: when the second user operation is determined to have been detected in step S107 (Yes in step S107), the control unit 13 sets the moving speed of the first object 23 to a predetermined value (for example, zero).

Step S109: when the second user operation is determined not to have been detected in step S107 (No in step S107), or after step S108, the control unit 13 determines whether or not the first user operation has been newly detected. When the first user operation is determined to have been newly detected (Yes in step S109), the process returns to step S101. On the other hand, when the first user operation is determined not to have been newly detected (No in step S109), the process returns to step S106.

Figure 13:
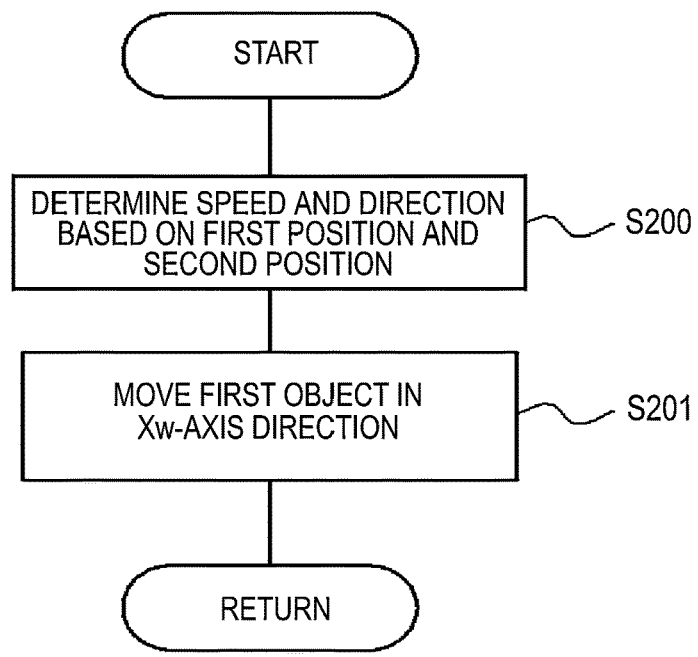
FIG. 13 is a flowchart illustrating an operation of a terminal control unit that performs a movement process in an Xw axis direction in FIG. 12.

Next, the movement process in the direction substantially parallel to the Xw-Zw plane (step S103) will be described in detail with reference to a flowchart illustrated in FIG. 13.

Step S200: First, the control unit 13 determines the moving speed and the moving direction of the first object 23 based on the first and second positions according to the first user operation. Specifically, the control unit 13 determines the moving speed of the first object 23 according to the x axis direction component of the distance between the first position and the second position (the absolute value of the x axis direction component of the first input vector). The control unit 13 determines the +Xw direction or the −Xw direction as the moving direction of the first object 23 according to whether the value obtained by subtracting an x coordinate of the second position from an x coordinate of the first position is positive or negative (according to the direction of the x axis direction component of the first input vector).

Step S201: Then, the control unit 13 moves the first object 23 relatively to the field object 16 in the Xw axis direction of the world coordinate system. Here, the moving speed and the moving direction of the first object 23 are the moving speed and the moving direction determined in step S200. Thereafter, the process proceeds to step S104 (see FIG. 12).

Figure 14:
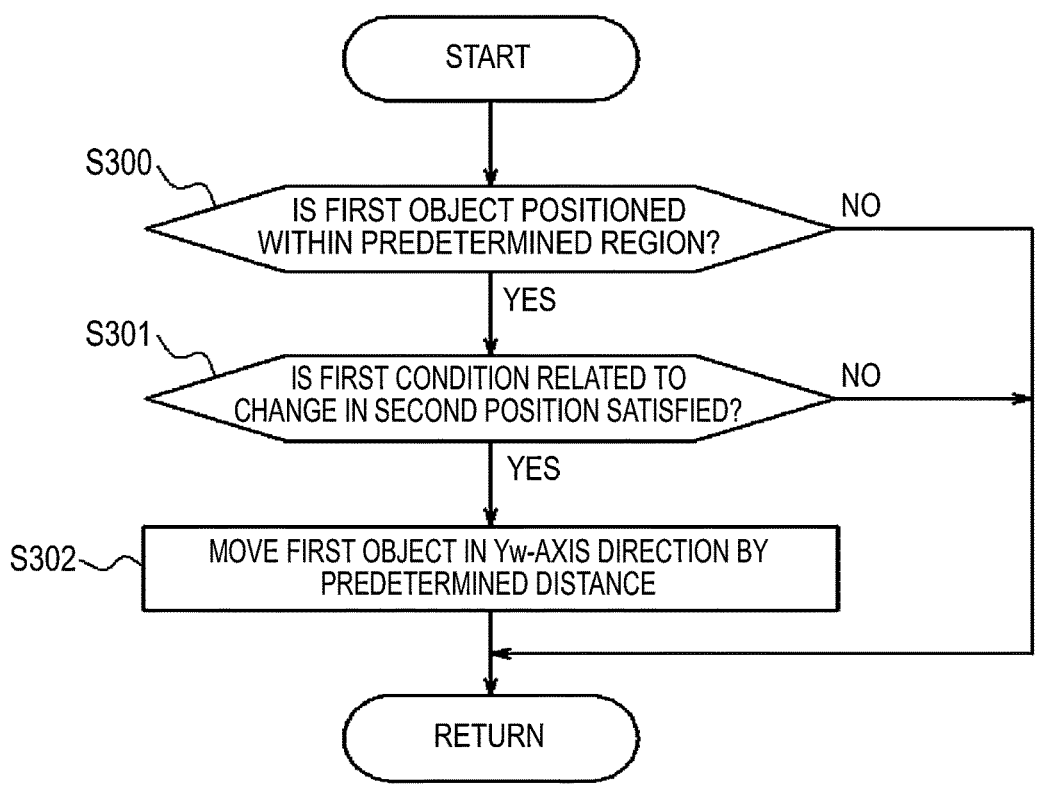
FIG. 14 is a flowchart illustrating an operation of a terminal control unit that performs a movement process in a Yw axis direction in FIG. 12.

Next, the movement process in the direction substantially parallel to the Yw-Zw plane (step S105) will be described in detail with reference to a flowchart illustrated in FIG. 14.

Step S300: First, the control unit 13 determines whether or not the first object 23 is positioned in the predetermined region 32 nearby the vertical path 20. When the first object 23 is determined to be positioned in the region 32 (Yes in step S300), the process proceeds to step S301. On the other hand, when the first object 23 is determined not to be positioned in the region 32 (No in step S300), the process proceeds to step S105 (see FIG. 12).

Step S301: when the first object 23 is determined to be positioned in the region 32 in step S300 (Yes in step S300), the control unit 13 determines whether or not the first condition related to the change in the second position according to the first user operation has been satisfied. When the first condition is determined to be satisfied (Yes in step S301), the process proceeds to step S302. On the other hand, when the first condition is determined not to have been satisfied (No in step S301), the process proceeds to step S105 (see FIG. 12).

Step S302: when the first condition is determined to be satisfied in step S301 (Yes in step S301), the control unit 13 moves the first object 23 relatively to the field object 16 in the direction substantially parallel to the Yw-Zw plane in the virtual space by a predetermined distance. Here, the predetermined distance is, for example, the length of the vertical path 20 in the longitudinal direction (the Yw axis direction in the present embodiment).

As described above, the information processing apparatus 10 according to the present embodiment moves the first object 23 relatively to the field object 16. Here, the field object 16 includes an inclined portion that has a shape in which the cross-sectional shape in the plane substantially parallel to the Yw-Zw plane (the first plane) extends in the Xw axis (first axis) direction in the state in which it is arranged in the virtual space and is inclined downwards when viewed from the virtual camera 21 as it get away in the direction of the optical axis 22 of the virtual camera 21. Through this configuration, as will be described below, the visibility of the field screen can be improved, and the field screen suitable for the information processing apparatus 10 equipped with a display unit d12 having a limited screen size such as a smart phone can be implemented.

For example, in a display apparatus with which the smart phone, commonly, dimensions in the horizontal direction and the vertical direction are different, and its screen size is relatively small. For this reason, for example, in a field screen in which a flat field is looked down from the above, a field is displayed only within a range of a relatively small display region in the short direction of the screen. On the other hand, according to the information processing apparatus 10, at least a part of the inclined portion of the field object 16 is displayed as a field that is spread on the field screen in a depth direction. In other words, since the display is performed in the state in which at least a part of the inclined portion is distorted (compressed) in the short direction of the field screen, the range of the field that is displayed on the screen at a time is increased, and thus the visibility of the field screen is improved. The field object 16 has the shape in which it extends in the longitudinal direction (the horizontal direction) of the field screen. Thus, the distortion of the field object 16 displayed on the field screen in the longitudinal direction of the screen is reduced, and the visibility of the field screen is improved.

Further, when the first object 23 is moved in the direction substantially parallel to the Xw-Zw plane (the second plane), the information processing apparatus 10 moves the field object 16 in parallel to the Xw axis (first axis) direction. Further, when the first object 23 is moved in the direction substantially parallel to the Yw-Zw plane (the first plane), the information processing apparatus 10 moves the field object 16 in the direction substantially parallel to the Yw-Zw plane in a different form from parallel translation. Through this configuration, when the first object 23 is moved in the short direction of the field screen, different visual effects are implemented from when the first object 23 is moved in the longitudinal direction of the field screen, and expansion of the field in the depth direction of the field screen can be displayed, and thus the visibility of the field screen is improved to be higher than, for example, a configuration in which the screen is scrolled in both the horizontal direction and the vertical direction and displayed.

The information processing apparatus 10 performs control such that the image projection planes of the first object 23 and the second object 24 satisfy a predetermined condition for the optical axis 22 of the virtual camera 21. Through this configuration, the first object 23 and the second object 24 are displayed on the field screen in substantially parallel to the field screen, and thus the visibility of the field screen is further improved.

The field object 16 includes the first portion 17 and the second portion 18 extending from the end portion of the first portion 17. Through this configuration, for example, the field is displayed to be relatively large at the front side of the field screen, and the field is compressed in the vertical direction through the second portion 18 and displayed at the depth side, and thus the field screen suitable for the display unit 12 having the limited display region can be implemented.

The field object 16 includes the first specific region and the second specific region that are consecutive in the Xw axis direction in the state in which it is arranged in the virtual space. When the first object 23 stays in the first specific region, the information processing apparatus 10 performs a different process from when the first object 23 stays in the second specific region. Through this configuration, the first object 23 (the user character) can seamlessly enter or leave, for example, a town. Thus, for example, compared to a configuration in which a screen display is switched when an object enter or leave a town, the occurrence of a uncomfortable feeling about an expression when the screen is switched is suppressed, and the occurrence of a standby time until the screen is switched is suppressed. As described above, the user can have experience of perceiving continuity of the field in the game.

The information processing apparatus 10 according to the present embodiment detects the first and second positions while the first user operation is being detected. The information processing apparatus 10 moves the first object 23 in the direction substantially parallel to the Xw-Zw plane (the first plane) based on both of the first and second positions, and moves the first object 23 in the direction substantially parallel to the Yw-Zw plane (the second plane) according to the change in the second position. As described above, information used for the movement in the direction substantially parallel to the first plane among the information detected according to the first user operation is different from information used for the movement in the direction substantially parallel to the second plane. Through this configuration, for example, when the user moves the first object 23 in the direction substantially parallel to the first plane, the first object 23 is suppressed from moving in a direction that is not intended by the user, for example, the first object 23 is suppressed from moving in the direction substantially parallel to the second plane, for example, due to the delicate position deviation of the first user operation, and thus the operability of the game is improved.

Further, when the end of the first user operation is detected, the information processing apparatus 10 moves the first object 23 in the Xw axis direction while changing (for example, reducing) the moving speed of the first object 23. Through this configuration, even when the user takes the finger off the display unit 12, the first object 23 continuously moves in the Xw axis direction at the reduced speed, and thus an operation burden on the user who desires to cause the first object 23 to move a relatively long distance along the horizontal path 19 can be reduced, and the operability of the game is further improved.

Further, when the second user operation is detected while the first object 23 is being moved while changing the moving speed of the first object 23, the information processing apparatus 10 sets a predetermined value (for example, zero) as the moving speed of the first object 23. Through this configuration, as described above, the user can change the moving speed of the first object 23 moving in the Xw axis direction while changing the moving speed to a predetermined value at an arbitrary timing (for example, the user can stop the first object 23), and thus the operability of the game is further improved.

The invention has been described based on the drawings and the exemplary embodiment, but it will be appreciated that those having skill in the art can easily make various modification or corrections based on the present disclosure. Thus, it will be appreciated that such modification or corrections are included in the scope of the invention. For example, respective units or functions included in respective steps may be rearranged unless there is logically a contradiction, and a plurality of units or steps may be combined into one unit or step, or one unit or step may be divided into a plurality of units or steps.

For example, when the change in the second position is detected according to the first user operation while the first object 23 is being moved in the Xw axis direction according to the first user operation, the control unit 13 may set the moving speed of the first object 23 to a predetermined value (for example, zero) and determine that the end of the first user operation has been detected when the change speed of the second position (that is, the magnitude of the speed vector of the second position) is a predetermined threshold value or more. Through this configuration, the user who performs the first user operation can change the speed of the first object 23 to a predetermined value through a simple operation of moving the finger contacting with the display unit 12 rapidly, for example, while the first object 23 is being moved in the Xw axis direction at a relatively high speed. Thus, the operability of the game is further improved.

Alternatively, when the change speed of the second position is a predetermined threshold value or more, the control unit 13 may perform any other operation other than an operation of moving the first object 23 such as a predetermined action such as a jump. Through this configuration, for example, when an obstacle (the game content) such as a rock or a trap exists on the horizontal path 19, the user who performs the first user operation can operate the first object 23 to jump over an obstacle without ending the first user operation (for example, without taking the finger off the display unit 12). Thus, the operability of the game is further improved, and an action property of the game is formed, and thus the interest of the game is improved.

For example, when the first object 23 is moved in the Yw axis direction while the first user operation is being detected (that is, without detecting the end of the first user operation), the control unit 13 may automatically update the screen coordinates of the first position detected according to the detection of the first user operation, for example, from the screen coordinates of the position on the field screen that is initially designated by the swipe operation to other screen coordinates.

Specifically, when the change in the second position according to the first user operation is detected while the first object 23 is being moved in the Yw axis direction in the state in which the first user operation is detected (for example, in the state in which the field screen illustrated in FIG. 10 is displayed on the display unit 12), the control unit 13 sets the screen coordinates of the second position before the change as new screen coordinates of the first position.

Figure 15A:
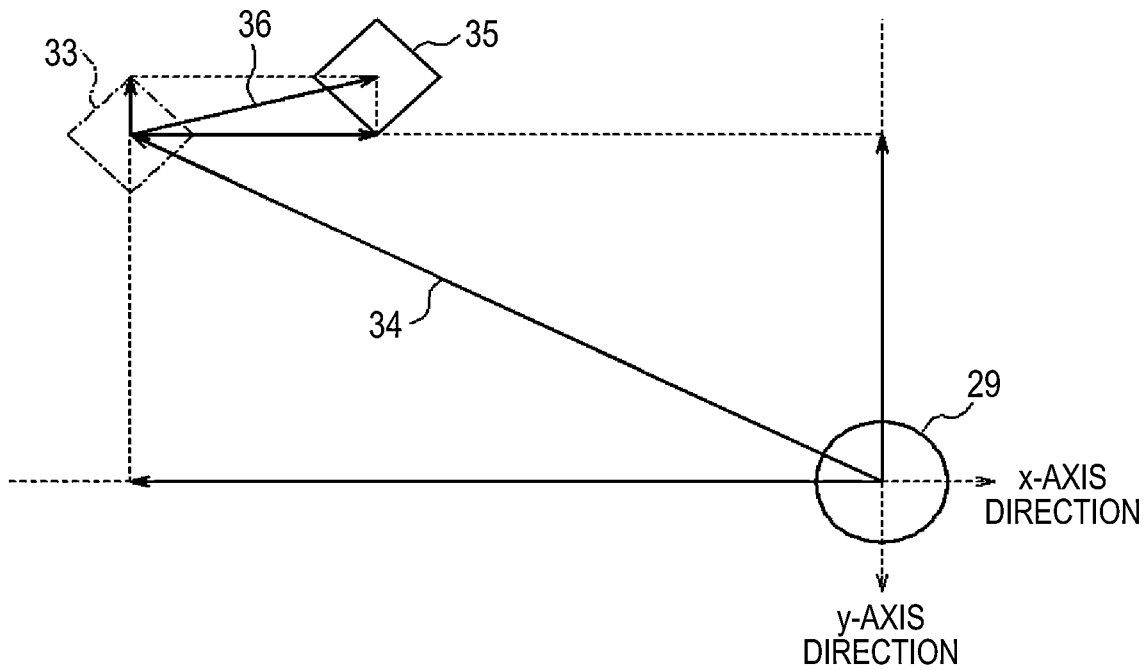
FIG. 15A is a diagram illustrating an example in which screen coordinates of a first position are automatically updated according to a change in a second position.
Figure 15B:
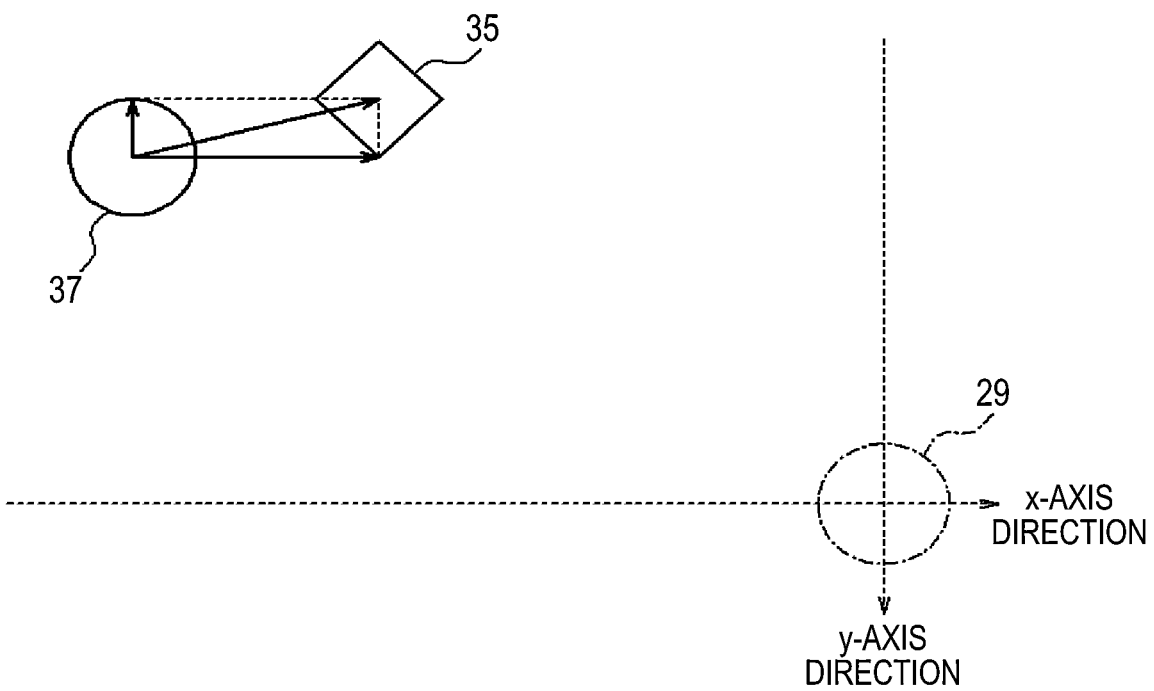
FIG. 15B is a diagram illustrating an example in which screen coordinates of a first position are automatically updated according to a change in a second position, and specifically showing the control unit setting the second position before the change as a new first position.

Preferably, for example, when the direction (the −y direction in FIG. 15(*a*)) of the y axis direction component of a position vector 34 of the second position 33 before the change having the first position 29 as the reference point is different from the direction (the +y direction in FIG. 15(*a*)) of the y axis direction component of a position vector 36 (that is, the second input vector) of a second position 35 after the change having the second position 33 before the change as the reference point as illustrated in FIG. 15(*a*), the control unit 13 sets the second position 33 before the change as a new first position 37 as illustrated in FIG. 15(*b*).

Through this configuration, for example, the user can move the first object 23 in an arbitrary direction along the Xw axis after moving the first object 23 up to another horizontal path 19*b* by causing the finger contacting with the display unit 12 to move a relatively short distance while the first object 23 is being moved along the vertical path 20. Specifically, for example, when the user desires to move the first object 23 in the −Xw direction in the horizontal path 19*a* at the front side, move the first object 23 in the −Yw direction along the vertical path 20 (see FIG. 10), and then move the first object 23 in the +Xw direction in another horizontal path 19*b* (see FIG. 11) as illustrated in FIG. 7, it is unnecessary to move the finger up to the +y side further than the first position 29, for example, as illustrated in FIG. 15(*a*). Thus, a complication of the user movement operation is reduced.

In the above embodiment, the configuration in which the first object 23 is moved relatively to the field object 16 in the direction substantially parallel to the Yw-Zw plane of the virtual space according to whether or not the first condition related to the change in the second position according to the first user operation is satisfied has been described, but the first object 23 may be moved in the direction substantially parallel to the Yw-Zw plane of the virtual space based on both of the first and second positions according to the first user operation.

Specifically, first, the control unit 13 determines whether or not the first object 23 is positioned in the predetermined region 32 nearby the vertical path 20. When the first object 23 is determined to be positioned in the region 32, the control unit 13 detects the first user operation and the first and second positions according to the first user operation. Then, the control unit 13 determines the moving speed of the first object 23 in the direction substantially parallel to the Yw-Zw plane according to the y axis direction component of the distance between the first position and the second position (that is, the absolute value of the y axis direction component of the first input vector). For example, as the y axis direction component of the distance between the first position and the second position increases, the moving speed of the first object 23 in the direction substantially parallel to the Yw-Zw plane increases. Here, when the first object 23 is moved at the determined moving speed, the first object 23 may be accelerated using the determined moving speed as an upper limit. The moving speed of the first object 23 in the direction substantially parallel to the Yw-Zw plane may change continuously or stepwise according to the y axis direction component of the distance between the first position and the second position.

Preferably, the control unit 13 determines whether or not the y axis direction component of the distance between the first position and the second position is a predetermined threshold value or more. When the y axis direction component of the distance between the first position and the second position is determined to be the predetermined threshold value or more, the control unit 13 moves the first object 23 in the direction substantially parallel to the Yw-Zw plane. On the other hand, when the y axis direction component of the distance between the first position and the second position is determined to be less than the threshold value, the control unit 13 sets the moving speed of the first object 23 in the direction substantially parallel to the Yw-Zw plane to zero.

Preferably, the moving speed of the first object 23 along the Xw axis (a moving speed Xw) when the x axis direction component of the distance between the first position and the second position is a predetermined value (a specific value) is different from the moving speed of the first object 23 (a moving speed Yw) in the direction substantially parallel to the Yw-Zw plane when the y axis direction component of the distance between the first position and the second position is the specific value. As described above, the control unit 13 determines the moving speed Xw and the moving speed Yw using different algorithms using the first and second positions according to the first user operation.

Here, as described above, since the display unit 12 has the longitudinal direction (for example, the horizontal direction) and the short direction (for example, the vertical direction), the length (size) of the operation region on the screen in the longitudinal direction is different from that in the short direction. Here, commonly, in the touch panel, the detection pitch in the horizontal direction is equal to that in the vertical direction. Thus, the number of points at which the user operation can be detected in the short direction of the screen is smaller than the number of points at which the user operation can be detected in the longitudinal direction of the screen. Thus, for example, in a configuration in which an algorithm of determining the moving speed Xw of the first object 23 is the same as an algorithm of determining the moving speed Yw, the operability of the game in the operation region in the short direction is lower than that in the operation region in the longitudinal direction. On the other hand, since the control unit 13 determines the moving speed Xw and the moving speed Yw through the different algorithms using the first and second positions, as described above, in the configuration in which the length (the size) of the operation region in the longitudinal direction of the field screen is different from the length (the size) of the operation region in the short direction, the operability of the game in the operation region in the short direction can be further improved.

For example, the moving speed Yw when the y axis direction component is a specific value is set to be smaller or larger than the moving speed Xw when the x axis direction component is a specific value. Preferably, when the y axis direction is the short direction, the moving speed Yw is set to be larger than the moving speed Xw. Here, the specific value may be an arbitrary value that the y axis direction component (the short direction component) of the distance between the first position and the second position can have.

Specifically, in the case of the configuration in which the moving speed Xw and the moving speed Yw of the first object 23 change continuously according to the x axis direction component and the y axis direction component of the distance between the first position and the second position, a change rate of the moving speed Yw for the y axis direction component of the distance between the first position and the second position is smaller or larger than a change rate of the moving speed Xw for the x axis direction component of the distance between the first position and the second position.

Specifically, in the case of the configuration in which the moving speed Xw and the moving speed Yw of the first object 23 change stepwise according to the x axis direction component and the y axis direction component of the distance between the first position and the second position, the number of steps of the moving speed Xw may be different from the number of steps of the moving speed Yw. For example, the control unit 13 determines a speed value of a step corresponding to the x axis direction component of the distance between the first position and the second position among speed values of n steps (2≤n) as the moving speed Xw. The control unit 13 determines a speed value of a step corresponding to the y axis direction component of the distance between the first position and the second position among speed values of m steps (1<m≤n) as the moving speed Yw. Here, the speed values corresponding to respective steps may be set at equal intervals (for example, 0, 5, 10, . . . ) or at different intervals (for example, 0, 1, 5, 15, . . . ). Ranges of the axis direction components of the moving speeds corresponding to respective steps may be set to be the same value (for example, 5 pixels) or different values (for example, 5 pixels and 10 pixels).

In the above embodiment, the configuration in which the moving speed Xw of the first object 23 is changed according to the end of the first user operation has been described above, but the moving speed Yw may be changed similarly. Specifically, when the end of the first user operation is detected, the control unit 13 moves the first object 23 while changing at least one of the moving speed Xw and the moving speed Yw of the first object 23.

In the above embodiment, the configuration in which when the first object 23 is moved relatively to the field object 16, the field object 16 is moved without substantially moving the first object 23 has been described above, but, for example, the first object 23 may be moved without substantially moving the field object 16. In this configuration, the control unit 13 moves the virtual camera 21 according to the movement of the first object 23 so that a relative position relation between the virtual camera 21 and the first object 23 is maintained.

In the above embodiment, the configuration in which the field object 16 arranged in the three dimensional virtual space is used as the field (the ground surface) has been described above, but, for example, a two dimensional virtual space may be used. In this case, all of the field, the first game content, the second game content, and the background may be configured with a two dimensional image.

The game according to the above embodiment has been described as being a role playing game or a simulation game, but the invention can be applied to games of various genres in which the game content is moved on the field in the game.

The information processing apparatus 10 may be able to communicate with a server apparatus, for example, via the Internet. In this configuration, the information processing apparatus 10 acquires another field image (for example, an image of a field indicating an inside of a cave or a building) from a server apparatus when the first object 23 is moved up to a predetermined position (for example, an entrance of a cave or a building) on the field. Then, the information processing apparatus 10 projects another field image received from the server apparatus onto other field object that is newly generated (defined) and arranges the first object 23 on the other field object. Through this configuration, a variation in the field is increased, and the interest of the game is improved, compared to the configuration using only the field image stored in the information processing apparatus 10.

Figure 16:
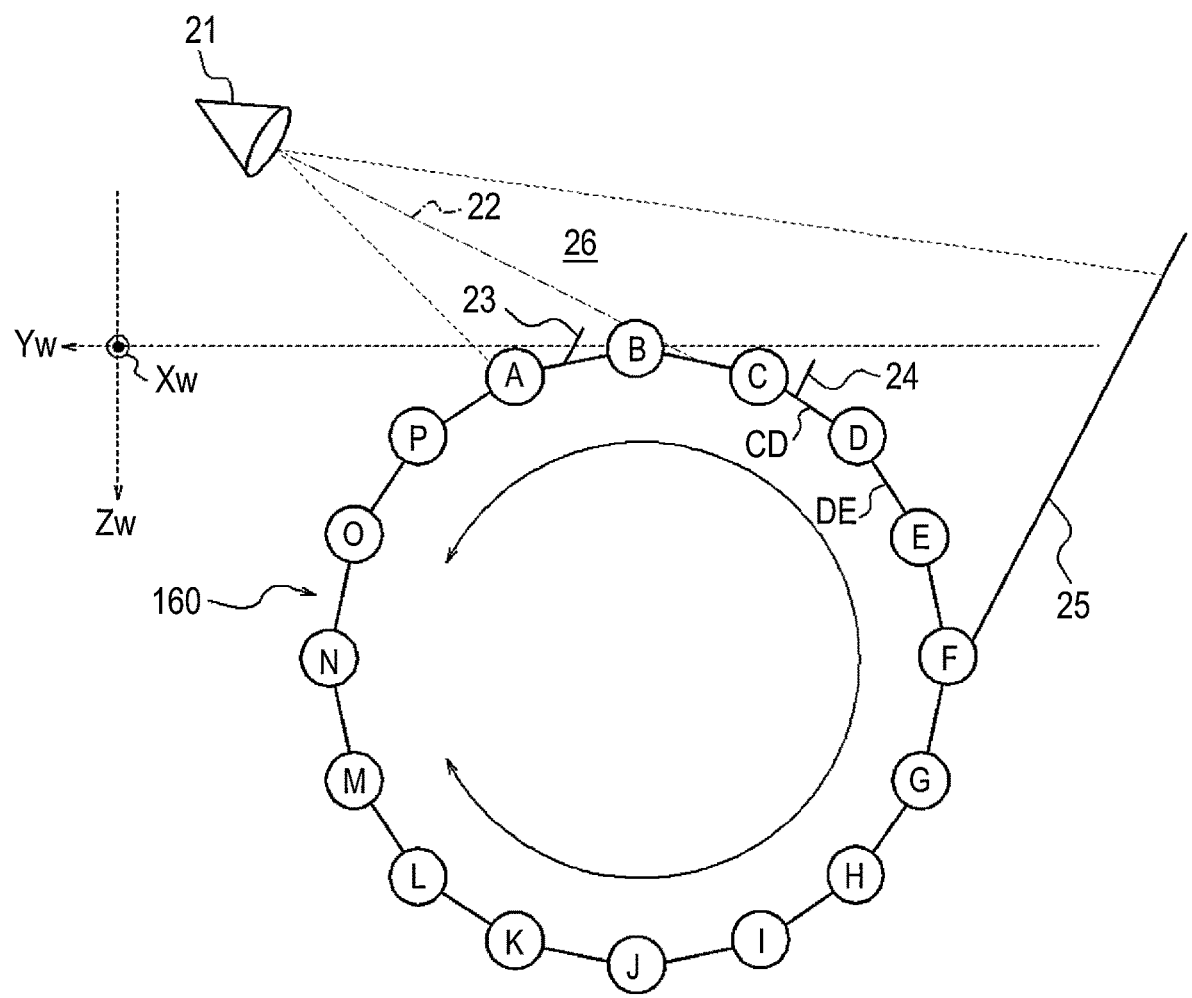
FIG. 16 is a cross-sectional diagram obtained by cutting a field object according to a modified example arranged in a virtual space along a plane substantially parallel to a Yw-Zw plane.

In the above embodiment, the configuration in which the field object 16 includes the first portion 17 and the second portion 18 has been described above, but the shape of the field object 16 is not limited thereto. A field object 160 according to a modified example of the embodiment has a cylindrical shape extending in the Xo axis direction in the object coordinate system, and, similarly to the above embodiment, the field object 160 includes an inclined portion that is inclined downwards when viewed from the virtual camera 21 as it gets away in the direction of the optical axis 22 of the virtual camera 21 in the state in which it is arranged in the virtual space. Specifically, the field object 160 has a square tube shape or substantially a cylindrical shape that is rotationally symmetric with respect to the Xo axis or has a square tube shape or a substantially cylindrical shape that is rotationally asymmetric with respect to the Xo axis. For example, FIG. 16 is a cross-sectional diagram obtained by cutting the field object 160 along the plane substantially parallel to the Yw-Zw plane in a state in which the field object 160 having the square tube shape that is rotationally symmetric with respect to the Xo axis is arranged in the virtual space, similarly to the above embodiment. In FIG. 16, for example, object elements CD and DE correspond to the inclined portion.

In a configuration employing the field object 160, when the first condition is determined to be satisfied, the control unit 13 moves the first object 23 relatively to the field object 160 in the direction substantially parallel to the Yw-Zw plane of the virtual space in the virtual space by a predetermined distance. Specifically, the control unit 13 causes the field object 160 to rotate around the Xw axis in the virtual space without substantially moving the first object 23 in the virtual space. When the field object 16 rotates, each apex existing on a plane parallel to the Yw-Zw plane among a plurality of apexes on the field object 16 moves on the plane along a trajectory of a concentric circle having the Xw axis as the center.

In the above embodiment, a web display in which some of various kinds of game screens are displayed on the information processing apparatus 10 based on data generated by the server apparatus capable of communicating with the information processing apparatus 10 may be performed, or a native display in which some game screens (for example, a header region and a footer region in which a menu button is arranged) is displayed by a native application installed in the information processing apparatus 10 may be performed. As described above, the game according to the above embodiment may be a hybrid game in which each of the information processing apparatus 10 and the server apparatus undertakes a part of a process.

An apparatus capable of performing information processing such as a computer or a mobile phone in order to function as the information processing apparatus 10 according to the above embodiment can be suitably used. The apparatus can be implemented by storing a program in which processing content for implementing the respective functions of the information processing apparatus 10 according to the embodiment is described in a storage unit of the apparatus and reading and executing the program through a CPU of the apparatus.

REFERENCE SIGN LIST 10 information processing apparatus
11 storage unit
12 display unit
13 control unit
14 first region
15 second region
16, 160 field object
17 first portion
18 second portion
19, 19a, 19b horizontal path
20 vertical path
21 virtual camera
22 optical axis
23 first object
24 second object
25 background object
26 field of view
27 field region
28 background region
29 first position
30 second position
31 first input vector
32 region
33 second position
34 position vector
35 second position
36 position vector
37 first position

What is claimed is:

1. A game control method performed by an information processing apparatus, comprising:
    causing an object arranged on a field object in a virtual space in which a world coordinate system having a first axis and a second axis is set to be displayed on a screen in which a screen coordinate system having a third axis and a fourth axis is set;
    detecting a first user operation;
    detecting first and second positions on the screen according to the first user operation while the first user operation is being detected;
    moving the object relatively to the object in the virtual space according to the detected first user operation, wherein a speed and a direction of moving the object in the first moving step are determined based on a distance between the first position and the second position; and
    determining when the object has been arranged in a first area of the field object proximate to a second object, and, when the object has been arranged in the first area, initiating a first gameplay interaction between the object and the second object.

2. The method according to claim 1, further comprising:
    determining when the object has been arranged in a second area of the field object proximate to a third object, and, when the object has been arranged in the second area, initiating a second gameplay interaction between the object and the third object, wherein the second gameplay interaction is different from the first gameplay interaction.

3. The method according to claim 1, further comprising executing at least one of:
    a conversation between the object and the second object, and
    a battle between the object and the second object.

4. The method according to claim 1, wherein moving the object relatively to the object in the virtual space further comprises:
    setting a first speed component serving as a first axis direction component of a moving speed of the object according to a third axis direction component of a distance between the first position and the second position;
    setting a second speed component serving as a second axis direction component of the moving speed of the object according to a fourth axis direction component of a distance between the first position and the second position; and
    causing the object to perform a predetermined action when the screen coordinates of the second position are changed according to the first user operation, and the change speed of the second position is a predetermined threshold value or more.

5. The method according to claim 4, wherein the predetermined action does not end a process of moving the object relatively to the object in the virtual space.

6. The method according to claim 1, wherein causing the object arranged on the field object to be displayed comprises:
    arranging the object on the gameplay field on at least one of a plurality of paths;
    arranging a background object on the gameplay field on an object element; and
    projecting a background image onto the background object in virtual space.

7. The method according to claim 1, further comprising:
generating a virtual camera arranged in the virtual space; and
positioning the virtual camera in a positive position on the fifth axis such that the field object is provided between the virtual camera and a portion of the background object.

8. A game control method performed by an information processing apparatus, comprising:
causing a first object arranged on a field object in a virtual space in which a world coordinate system having a first axis and a second axis is set to be displayed on a screen in which a screen coordinate system having a third axis and a fourth axis is set;
detecting a first user operation;
detecting first and second positions on the screen according to the first user operation while the first user operation is being detected;
moving the first object relatively to the field object in the virtual space according to the first user operation, wherein a speed and a direction of moving the object in the first moving step are determined based on a distance between the first position and the second position; and
with a mapping interaction function, relating a pair of objects including the first object and a second object and executing particularized processing including both the first object and the second object, comprising:
updating an area of the field object in which the first object is arranged, determining an area type of the area of the field object in which the first object is arranged, and determining that the second object is present in the area;
determining, based on the area type, a valid gameplay interaction type corresponding to the area type; and
pairing the first object and the second object and initiating a first gameplay interaction specific to the first object and the second object.

9. The method according to claim 8, further comprising:
determining, based on the mapping interaction function, when the first object has been subsequently arranged in a second area of the field object proximate to a third object, and, when the first object has been arranged in the second area, initiating a second gameplay interaction between the first object and the third object, wherein the second gameplay interaction is different from the first gameplay interaction.

10. The method according to claim 8, wherein the gameplay interaction specific to the first object and the second object is at least one of:
a conversation between the first object and the second object; and
a battle between the first object and the second object.

11. The method according to claim 8, wherein moving the object relatively to the object in the virtual space further comprises:
setting a first speed component serving as a first axis direction component of a moving speed of the first object according to a third axis direction component of a distance between the first position and the second position;
setting a second speed component serving as a second axis direction component of the moving speed of the first object according to a fourth axis direction component of a distance between the first position and the second position; and
causing the first object to perform a predetermined action when the screen coordinates of the second position are changed according to the first user operation, and the change speed of the second position is a predetermined threshold value or more.

12. The method according to claim 11, wherein the predetermined action does not end a process of moving the object relatively to the object in the virtual space.

13. The method according to claim 8, causing the first object arranged on the field object to be displayed comprises:
arranging the first object on the gameplay field on at least one of a plurality of paths;
arranging a background object on the gameplay field on an object element; and
projecting a background image onto the background object in virtual space.

14. The method according to claim 13, wherein the area of the field object in which the first object is arranged comprises at least a portion of one of the plurality of paths.

15. The method according to claim 8, further comprising:
generating a virtual camera arranged in the virtual space; and
positioning the virtual camera in a positive position on a fifth axis such that the field object is provided between the virtual camera and a portion of a background object.

16. The method according to claim 15, further comprising:
projecting a background image onto the background object and preserving continuity of the background image during the first moving step.

17. An information processing apparatus configured to execute a game, the information processing apparatus comprising a processor, a memory, and a display;
wherein the display is configured to display a screen; and
wherein the memory comprises program code instructions that, when executed, are configured to cause the processor to perform steps of:
causing an object arranged on a field object in a virtual space in which a world coordinate system having a first axis and a second axis is set to be displayed on the screen, the screen comprising a screen coordinate system having a third axis and a fourth axis;
detecting a first user operation;
detecting first and second positions on the screen according to the first user operation while the first user operation is being detected;
moving the object relatively to the object in the virtual space according to the detected first user operation, wherein a speed and a direction of moving the object in the first moving step are determined based on a distance between the first position and the second position; and
determining when the object has been arranged in a first area of the field object proximate to a second object, and, when the object has been arranged in the first area, initiating a first gameplay interaction between the object and the second object.

18. An information processing system configured to cause a game to be executed, the system comprising at least a server apparatus and a terminal apparatus, the terminal apparatus comprising a processor, a memory, and a display;
wherein the display is configured to display a screen; and
wherein at least one of the server apparatus and the terminal apparatus is configured to perform steps of:
causing an object arranged on a field object in a virtual space in which a world coordinate system having a first axis and a second axis is set to be displayed on the screen, the screen comprising a screen coordinate system having a third axis and a fourth axis;

detecting a first user operation provided on the terminal apparatus;

detecting first and second positions on the screen according to the first user operation while the first user operation is being detected;

moving the object relatively to the object in the virtual space according to the detected first user operation, wherein a speed and a direction of moving the object in the first moving step are determined based on a distance between the first position and the second position; and determining when the object has been arranged in a first area of the field object proximate to a second object, and, when the object has been arranged in the first area, initiating a first gameplay interaction between the object and the second object.

19. An information processing apparatus configured to execute a game, the information processing apparatus comprising a processor, a memory, and a display;

wherein the display is configured to display a screen; and wherein the memory comprises program code instructions that, when executed, are configured to cause the processor to perform steps of:

causing a first object arranged on a field object in a virtual space in which a world coordinate system having a first axis and a second axis is set to be displayed on the screen, the screen comprising a screen coordinate system having a third axis and a fourth axis;

detecting a first user operation;

detecting first and second positions on the screen according to the first user operation while the first user operation is being detected;

moving the first object relatively to the field object in the virtual space according to the first user operation, wherein a speed and a direction of moving the object in the first moving step are determined based on a distance between the first position and the second position; and with a mapping interaction function, relating a pair of objects including the first object and a second object and executing particularized processing including both the first object and the second object, comprising:

updating an area of the field object in which the first object is arranged, determining an area type of the area of the field object in which the first object is arranged, and determining that the second object is present in the area;

determining, based on the area type, a valid gameplay interaction type corresponding to the area type; and pairing the first object and the second object and initiating a first gameplay interaction specific to the first object and the second object.

20. An information processing system configured to cause a game to be executed, the system comprising at least a server apparatus and a terminal apparatus, the terminal apparatus comprising a processor, a memory, and a display;

wherein the display is configured to display a screen; and wherein at least one of the server apparatus and the terminal apparatus is configured to perform steps of:

causing a first object arranged on a field object in a virtual space in which a world coordinate system having a first axis and a second axis is set to be displayed on the screen, the screen comprising a screen coordinate system having a third axis and a fourth axis;

detecting a first user operation;

detecting first and second positions on the screen according to the first user operation while the first user operation is being detected;

moving the first object relatively to the field object in the virtual space according to the first user operation, wherein a speed and a direction of moving the object in the first moving step are determined based on a distance between the first position and the second position; and with a mapping interaction function, relating a pair of objects including the first object and a second object and executing particularized processing including both the first object and the second object, comprising:

updating an area of the field object in which the first object is arranged, determining an area type of the area of the field object in which the first object is arranged, and determining that the second object is present in the area;

determining, based on the area type, a valid gameplay interaction type corresponding to the area type; and pairing the first object and the second object and initiating a first gameplay interaction specific to the first object and the second object.

* * * * *